US012405555B2

(12) United States Patent
Takagi

(10) Patent No.: US 12,405,555 B2

(45) Date of Patent: Sep. 2, 2025

(54) TRANSFER DEVICE AND IMAGE FORMING APPARATUS

(71) Applicant: Hiroaki Takagi, Kanagawa (JP)

(72) Inventor: Hiroaki Takagi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 123 days.

(21) Appl. No.: 18/206,120

(22) Filed: Jun. 6, 2023

(65) Prior Publication Data

US 2023/0393496 A1 Dec. 7, 2023

(30) Foreign Application Priority Data

Jun. 6, 2022 (JP) ................................ 2022-091528

(51) Int. Cl.
*G03G 15/16* (2006.01)

(52) U.S. Cl.
CPC ................................ *G03G 15/1615* (2013.01)

(58) Field of Classification Search
CPC .................................................. G03G 15/1615
See application file for complete search history.

(56) References Cited

U.S. PATENT DOCUMENTS 8,346,138 B2 * 1/2013 Sugitani ............. G03G 15/0194 399/302
8,620,188 B2 * 12/2013 Yoshida ............. G03G 15/0136 399/43
9,367,018 B1 6/2016 Yanagawa et al.
2003/0219288 A1 * 11/2003 Hagiwara .......... G03G 15/0136 399/302
2006/0127140 A1 * 6/2006 Miyake .............. G03G 15/1675 399/302
2010/0232819 A1 9/2010 Kudo et al.
2010/0239282 A1 9/2010 Ashikawa et al.
2011/0064487 A1 * 3/2011 Ichihashi ........... G03G 15/0136 399/302
2011/0110691 A1 5/2011 Hirose et al.
(Continued)

FOREIGN PATENT DOCUMENTS

JP 2006-030737 2/2006
JP 2010-217704 9/2010
JP 2023-022732 2/2023

*Primary Examiner* — Sevan A Aydin
(74) *Attorney, Agent, or Firm* — XSENSUS LLP

(57) ABSTRACT

A transfer device includes an intermediate transferor to rotate, primary transfer sections, a tension roller, a first movement mechanism, and a second movement mechanism. Each of the primary transfer sections includes a primary transferor. The tension roller stretches the intermediate transferor. The first movement mechanism causes the tension roller to move and change a position at which the tension roller stretches the intermediate transferor. The second movement mechanism causes the primary transferor of a primary transfer section to move to a contact position at which the primary transferor contacts a latent image bearer and a separation position at which the primary transferor is separated from the latent image bearer. The most-downstream primary transferor is movable between a contact position and a separation position. The first movement mechanism causes the tension roller to move to at least three positions at each of which the tension roller stretches the intermediate transferor.

20 Claims, 17 Drawing Sheets

(56) References Cited

U.S. PATENT DOCUMENTS

| | | | | |
|---|---|---|---|---|
| 2012/0190489 | A1 | 7/2012 | Takagi | |
| 2012/0237260 | A1* | 9/2012 | Sengoku | G03G 15/161<br>198/813 |
| 2013/0071150 | A1 | 3/2013 | Takagi | |
| 2015/0240879 | A1 | 8/2015 | Takagi et al. | |
| 2016/0062300 | A1 | 3/2016 | Takagi et al. | |
| 2016/0223977 | A1 | 8/2016 | Yamazaki et al. | |
| 2016/0238981 | A1 | 8/2016 | Suido et al. | |
| 2016/0349672 | A1* | 12/2016 | Miyakoshi | G03G 15/1605 |
| 2017/0010576 | A1 | 1/2017 | Takagi et al. | |
| 2017/0357200 | A1 | 12/2017 | Takagi et al. | |
| 2018/0074455 | A1 | 3/2018 | Takagi | |
| 2019/0286003 | A1* | 9/2019 | Iwadate | G03G 15/50 |
| 2019/0286017 | A1 | 9/2019 | Nakamoto et al. | |
| 2020/0004187 | A1 | 1/2020 | Takagi et al. | |
| 2020/0174395 | A1 | 6/2020 | Takagi | |
| 2020/0326648 | A1 | 10/2020 | Maehata et al. | |
| 2022/0308517 | A1 | 9/2022 | Takagi | |
| 2023/0042229 | A1* | 2/2023 | Nakamura | G03G 15/1615 |

* cited by examiner

TRANSFER DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-091528, filed on Jun. 6, 2022, in the Japan Patent Office, the entire disclosure of which is hereby incorporated by reference herein.

BACKGROUND

Technical Field

Embodiments of the present disclosure relate to a transfer device and an image forming apparatus.

Related Art

An image forming apparatus that prints a color image typically includes a transfer device for transferring toner of a special color such as a transparent color or a white color in addition to four colors of yellow (Y), magenta (M), cyan (C), and black (K). In such an image forming apparatus, first, toner images of the multiple colors are transferred to an intermediate transferor at primary transfer sections. Then, a multi-color toner image is secondarily transferred to a recording sheet such as a sheet of paper by a secondary transfer section.

For example, in addition to the four colors of YMCK, a primary transfer section that transfers a toner image of a transparent color is disposed most downstream on an intermediate transfer belt in a rotation direction of the intermediate transfer belt. When the toner image of the transparent color is not formed, a primary transfer roller of the primary transfer section corresponding to the transparent color is separated from a photoconductor, and a toner image forming device of the transparent toner is stopped. As described above, the transfer roller that does not form the toner image of the special color is separated from the photoconductor that serves as a latent image bearer. Due to such a configuration, excessive consumption of the toner of the special color can be prevented.

SUMMARY

In an embodiment of the present disclosure, a transfer device includes an intermediate transferor to rotate, multiple primary transfer sections, a tension roller, a first movement mechanism, and a second movement mechanism. The multiple primary transfer sections transfer developer images to the intermediate transferor and each of the plurality of primary transfer sections includes a primary transferor. The tension roller is disposed downstream from a most-downstream primary transferor of a most-downstream primary transfer section most downstream among the plurality of primary transfer sections in a rotation direction of the intermediate transferor, to stretch the intermediate transferor. The first movement mechanism causes the tension roller to move and change a position at which the tension roller stretches the intermediate transferor. The second movement mechanism causes the primary transferor of a primary transfer section upstream from the most-downstream primary transfer section in the rotation direction of the intermediate transferor to move to a contact position at which the primary transferor contacts a latent image bearer with the intermediate transferor interposed between the primary transferor and the latent image bearer and a separation position at which the primary transferor is separated from the latent image bearer. The most-downstream primary transferor is movable between a contact position at which the most-downstream primary transferor contacts another latent image bearer with the intermediate transferor interposed between the most-downstream primary transferor and said another latent image bearer and a separation position at which the most-downstream primary transferor is separated from said another latent image bearer. The first movement mechanism causes the tension roller to move to at least three positions at each of which the tension roller stretches the intermediate transferor.

In another embodiment of the present disclosure, an image forming apparatus includes the transfer device and multiple latent image bearers.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 27A is a plan view of the central primary transfer section in which the primary transfer rollers of the central primary transfer section contacts an intermediate transfer belt, according to the modification;

FIG. 28A is a plan view of the most-downstream primary transfer section in which the primary transfer roller of the most-downstream primary transfer section is arranged at a contact position;

FIG. 28B is a plan view of the most-downstream primary transfer section in which the primary transfer roller of the most-downstream primary transfer section is arranged at a small separation position;

FIG. 28C is a plan view of the most-downstream primary transfer section in which the primary transfer roller of the most-downstream primary transfer section is arranged at a large separation position;

FIG. 30A is a diagram illustrating the rotation mechanism in which a primary transfer roller of a most-downstream primary transfer section is arranged at a contact position; and FIG. 30B is a diagram illustrating the rotation mechanism in which the primary transfer roller of the most-downstream primary transfer section is arranged at a separation position.

Figure 1:
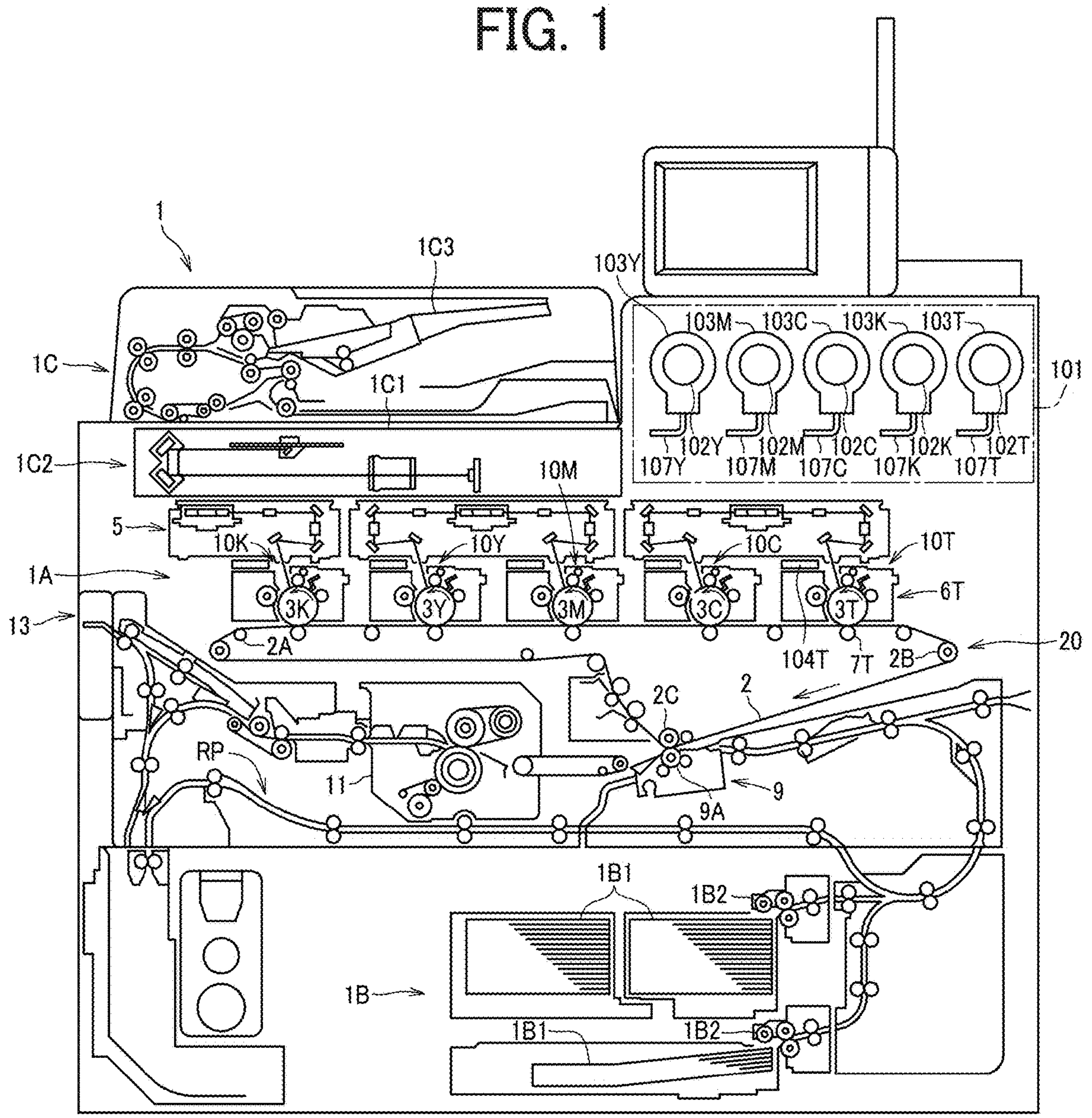
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Embodiments of the present disclosure are described below with reference to the drawings in the following description. In the drawings, like reference signs denote like or equivalent components and overlapping description of those components may be simplified or omitted as appropriate.

FIG. 1 is a diagram illustrating a configuration of an image forming apparatus 1 according to an embodiment of the present disclosure. The image forming apparatus 1 illustrated in FIG. 1 is a tandem-type color printer in which multiple photoconductors as latent image bearers are arranged in parallel. Each of the photoconductors provided for the image forming apparatus 1 can form a toner image in a color corresponding to a color separation component of a color image using toner as developer supplied from a developing device. After the toner images formed on the photoconductors are superimposed and transferred to an intermediate transferor, the superimposed images are collectively transferred to a sheet such as a recording sheet. By so doing, a multicolor image can be formed on the sheet. In embodiments of the present disclosure, the image forming apparatus 1 is not limited to a color printer. However, no limitation is indicated thereby, and the image forming apparatus 1 may be, for example, a color copier, a facsimile apparatus, or a printing machine.

As illustrated in FIG. 1, the image forming apparatus 1 includes an image former 1A in a center portion of the image forming apparatus 1 in the vertical direction, a sheet feeder 1B below the image former 1A, and a document scanner 1C including a document loading table 1C1 above the image former 1A. The image former 1A includes an intermediate transfer belt 2 as an intermediate transferor. The intermediate transfer belt 2 has a stretched surface in a horizontal direction. The image forming apparatus 1 includes components that form images in colors complementary to color separation colors above the intermediate transfer belt 2.

In the image former 1A, image forming devices 10K, 10C, 10M, 10Y, and 10T are arranged. The image forming devices 10K, 10C, 10M, and 10Y can form images with toners of colors of yellow, magenta, cyan, and black, respectively, in a complementary color relation. The image forming device 10T forms a glossy image with transparent toner. In each of the multiple image forming devices 10K, 10C, 10M, 10Y, and 10T, photoconductors 3K, 3C, 3M, 3Y, and 3T, respectively, that can bear images are arranged in parallel along the stretched surface of the intermediate transfer belt 2. The photoconductor 3T bears an image of a transparent toner. In the following description, each of the photoconductors 3K, 3C, 3M, 3Y, and 3T may be simply referred to as a photoconductor 3 in a case in which a similar description applies to all the photoconductors 3K, 3C, 3M, 3Y, and 3T.

Each of the multiple photoconductors 3K, 3C, 3M, 3Y, and 3T is made of a drum rotatable in the same direction, which is a counterclockwise direction in FIG. 1. Around each of the photoconductors 3K, 3C, 3M, 3Y, and 3T, a charger, a writing device, a developing device 6, a primary transfer roller as a primary transfer section, and a cleaner are arranged. Each of the photoconductors 3K, 3C, 3M, 3Y, and 3T, the charger, the writing device, the developing device 6, the primary transfer roller 7, and the cleaner collectively perform image forming processing when the photoconductors 3K, 3C, 3M, 3Y, and 3T rotate. For the sake of convenience, a developing device 6T and a primary transfer roller 7T provided for the photoconductor 3T includes the reference sign T.

A transfer device 20 includes the intermediate transfer belt 2, primary transfer rollers 7K, 7Y, 7M, 7C, and 7T (see FIG. 2) as primary transferors, and rollers 2A and 2B and a secondary-transfer backup roller 2C. Only the primary transfer roller 7T is illustrated with a reference sign in FIG. 1 for the sake of convenience.

Toner images formed in the image forming devices 10K, 10C, 10M, 10Y, and 10T including the multiple photoconductors 3K, 3C, 3M, 3Y, and 3T, respectively, are sequentially transferred to the intermediate transfer belt 2. The intermediate transfer belt 2 is stretched around the rollers 2A and 2B, the secondary-transfer backup roller 2C, and multiple rollers that are not denoted with reference signs in FIG. 1, to rotate in a direction indicated by arrow A in FIG. 1. The intermediate transfer belt 2 faces the photoconductors 3K, 3C, 3M, 3Y, and 3T at multiple positions. The rollers 2A and 2B stretch the intermediate transfer belt 2 at two positions outer than the multiple positions in the direction of rotation of the intermediate transfer belt 2. The secondary-transfer backup roller 2C faces the secondary transfer device 9 with the intermediate transfer belt 2 interposed between the secondary-transfer backup roller 2C and the secondary transfer device 9.

The secondary transfer device 9 includes a secondary transfer roller 9A. The secondary transfer roller 9A forms a secondary transfer nip at a position at which the secondary transfer roller 9A presses against the secondary-transfer backup roller 2C with the intermediate transfer belt 2 interposed between the secondary transfer roller 9A and the secondary-transfer backup roller 2C. A secondary transfer bias having the same polarity as the polarity of toner is applied to the secondary-transfer backup roller 2C. On the other hand, the secondary transfer roller 9A is grounded. Accordingly, a secondary transfer electric field is formed at the secondary transfer nip. The secondary transfer electric field electrostatically moves a multicolor toner image on the intermediate transfer belt 2 from the intermediate transfer belt 2 toward the secondary transfer roller 9A. The secondary transfer device 9 transfers the multicolor toner image onto a sheet, which is conveyed to the secondary transfer nip at the secondary transfer nip.

A recording sheet is fed to the secondary transfer nip from a sheet feeder 1B. The sheet feeder 1B includes multiple sheet feed trays 1B1 and multiple conveyance rollers 1B2. The multiple conveyance rollers 1B2 are disposed on a conveyance path of recording sheets fed from the sheet feed trays 1B1.

The photoconductors 3K, 3C, 3M, 3Y, and 3T are irradiated with writing light by the corresponding one of the writing devices 5, and electrostatic latent images corresponding to image data are formed on the photoconductors 3K, 3C, 3M, 3Y, and 3T. The image data is obtained by scanning a document on the document loading table 1C1 disposed in the document scanner 1C, or by image data output from a computer.

The document scanner 1C includes a scanner 1C2 and an automatic document feeder 1C3. The scanner 1C2 exposes and scans a document on the document loading table 1C1. The automatic document feeder 1C3 is disposed above an upper surface of the document loading table 1C1. The automatic document feeder 1C3 inverts a document fed onto the document loading table 1C1 to scan front and back sides of the document.

Each of the electrostatic latent images on the photoconductors 3K, 3C, 3M, 3Y, and 3T formed by the writing devices 5 is subjected to visual image processing by the corresponding one of the developing devices 6K, 6C, 6M, 6Y, and 6T and primarily transferred to the intermediate transfer belt 2. The developing device 6T is illustrated in FIG. 1 for the sake of convenience. After toner images of black, yellow, cyan, magenta, and transparent colors are superimposed and transferred onto the intermediate transfer belt 2, the toner images are secondarily transferred onto a recording sheet collectively by the secondary transfer device 9.

Subsequently, a multicolor image to be fixed bome on the surface of the recording sheet on which the secondary transfer has been performed is fixed by the fixing device 11. The fixing device 11 has a belt fixing structure in which a fixing belt heated by a heating roller and a pressure roller facing and in contact with the fixing belt are disposed. In such a configuration, a contact area, in other words, a nip area is disposed between the fixing belt and the pressure roller, thus allowing an area in which the recording sheet is heated to be increased as compared with a heat-roller fixing structure.

A conveyance direction of the recording sheet that has passed through the fixing device 11 can be switched by a conveyance-path switching claw disposed in a rear portion of the fixing device 11. Specifically, the conveyance direction of the recording sheet is selected between the conveyance path directed to a sheet ejector 13 and a reverse conveyance path RP by the conveyance-path switching claw.

In the image forming apparatus 1 having the above-described configuration, electrostatic latent images are formed on the uniformly charged photoconductors 3K, 3C, 3M, 3Y, and 3T by exposure scanning of a document placed on the document loading table 1C1 or by reading image data from a computer. Subsequently, the electrostatic latent images are subjected to visual image processing by the developing devices 6K, 6C, 6M, 6Y, and 6T. Then, the toner images are primarily transferred to the intermediate transfer belt 2.

In the case of a single-color image, a toner image that has been transferred to the intermediate transfer belt 2 is transferred onto a recording sheet fed from the sheet feeder 1B as is. In the case of a multi-color image, primary transfer is repeated such that toner images are superimposed one on another. Then, the toner images are secondarily transferred to the recording sheet collectively. The unfixed image that has been secondarily transferred onto the recording sheet is fixed by the fixing device 11. Then, the recording sheet is fed to the sheet ejector 13 or reversed and fed again to the secondary transfer nip.

In FIG. 1, the intermediate transfer belt 2 is formed of, for example, a single layer or multiple layers of polyvinylidene fluoride (PVDF), ethylene-tetrafluoroethylene copolymer (ETFE), polyimide (PI), or polycarbonate (PC). A conductive material such as carbon black is dispersed in the intermediate transfer belt 10. The intermediate transfer belt 2 is adjusted to have a volume resistivity in a range of 108 to 1012 Ωcm and a surface resistivity in a range of 109 to 1013 Ωcm. The surface of the intermediate transfer belt 2 may be coated with a release layer as needed. Examples of the material employed for coating the intermediate transfer belt 2 include fluororesins such as ethylene-tetrafluoroethylene copolymer (ETFE), polytetrafluoroethylene (PTFE), polyvinylidene fluoride (PVDF), perfluoroalkoxy fluororesin (PFA), tetrafluoroethylene-hexafluoropropylene copolymer (FEP), and vinyl fluoride (PVF). However, the materials employed for coating the intermediate transfer belt 2 are not limited to the above-described fluororesins. Examples of a method for producing the intermediate transfer belt 2 include a casting method and a centrifugal molding method. The surface of the intermediate transfer belt 2 may be polished as needed. When the volume resistivity of the intermediate transfer belt 2 exceeds the above-described range, a bias needed to transfer a toner image onto a recording sheet increases. Accordingly, the cost of power source for the intermediate transfer belt 2 is increased. For this reason, such a configuration of the intermediate transfer belt 2 is not preferable. Further, charging potential of the intermediate transfer belt 2 increases in, for example, a transfer process, or a transfer-sheet peeling process. Accordingly, self-discharge of the intermediate transfer belt 2 may be difficult. For this reason, an electric-charge remover is needed. In addition, when the volume-resistivity and the surface-resistivity of the intermediate transfer belt 2 are lower than the above-described ranges, attenuation of the charging potential is fast, which is advantageous for removing electric charges of the intermediate transfer belt 2 due to self-discharge. However, an electric current at the time of transfer flows in a plane direction of the surface of the intermediate transfer belt 2. Accordingly, toner scattering may occur. For this reason, the volume resistivity and the surface resistivity of the intermediate transfer belt 2 according to the present embodiment are preferably set within the ranges described above. Note that, for the measurement of the volume resistivity and the surface resistivity of the intermediate transfer belt 2, a high-resistance resistivity meter (Hiresta-IP, registered trademark, manufactured by Mitsubishi Chemical Corporation) was connected to a high resistance state (HRS) probe having the inner electrode diameter of 5.9 mm and the ring-electrode inner-diameter of 11 mm. A voltage of 100 V with the surface resistivity of 500 V was applied to the front and back surfaces of the intermediate transfer belt 2 and a measured value after 10 seconds from a time at which the voltage of 100 V and the surface resistivity of 500 V was applied, was employed.

The intermediate transfer belt 2 is stretched around at least the roller 2A and the roller 2B as a roller pair and the secondary-transfer backup roller 2C disposed at the secondary transfer nip. The roller 2A as a driving roller is set to rotate clockwise such that the intermediate transfer belt 2 moves in the direction indicated by arrow A illustrated inside the intermediate transfer belt 2 in FIG. 1. The surface of the intermediate transfer belt 2, on which the toner images are transferred, moving between the roller 2A and the roller 2B faces the multiple photoconductors 3K, 3Y, 3C, 3M, and 3T of the image forming devices 10K, 10C, 10M, 10Y, and 10T. The primary transfer rollers 7K, 7Y, 7M, 7C, and 7T serve as transferors for electrostatically transferring visible images on the respective photoconductors 3 to the intermediate transfer belt 2. The primary transfer rollers 7K, 7Y, 7M, 7C, and 7T are disposed at positions at which the primary transfer rollers 7K, 7Y, 7M, 7C, and 7T face the photoconductors 3K, 3C, 3M, 3Y, and 3T, respectively, via the intermediate transfer belt 2. The primary transfer roller 7T is illustrated in FIG. 1 for the sake of convenience.

The primary transfer rollers 7K, 7Y, 7M, 7C, and 7T according to the present embodiment are cored bars made of metal such as iron, steel use stainless (SUS), or aluminum (Al) coated with foam resin. The foam resin has a wall thickness of 2 mm to 10 mm. Blade-shaped or brush-shaped transferors known in the art can also be employed as the transferors.

In the present embodiment, white toner is employed for the purpose of forming a white base color for an image in addition to toner employed for full-color image formation. In addition, transparent toner may be employed for the purpose of improving glossiness and transferability of an image, and, for example, light cyan toner, or light magenta toner may be selected for increasing a color gamut. For the purpose of creating a colored metal color such as a red copper color and a bronze color, toner of a metal color such as gold toner and silver toner may also be employed as a base.

Figure 2:
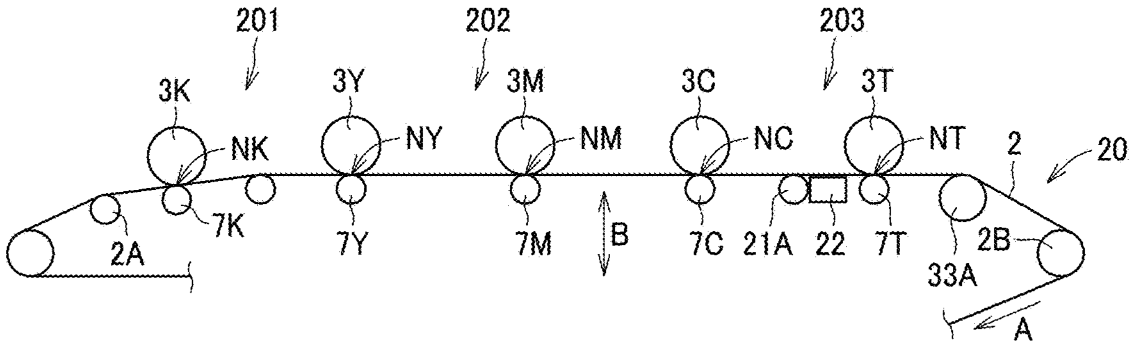
FIG. 2 is a schematic diagram illustrating a configuration of a transfer device according to an embodiment of the present disclosure.
Figure 3A:
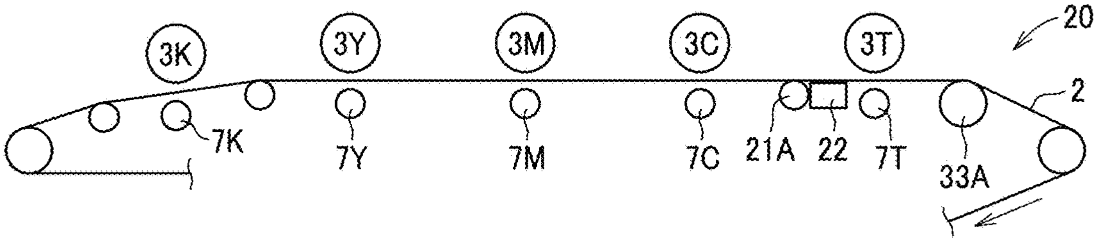
FIGS. 3A, 3B, 3C, 3D, 3E, and 3F are diagrams illustrating the transfer device of FIG. 2 that operates in modes A, B, C, D, E and F, respectively, according to an embodiment of the present disclosure.
Figure 3B:
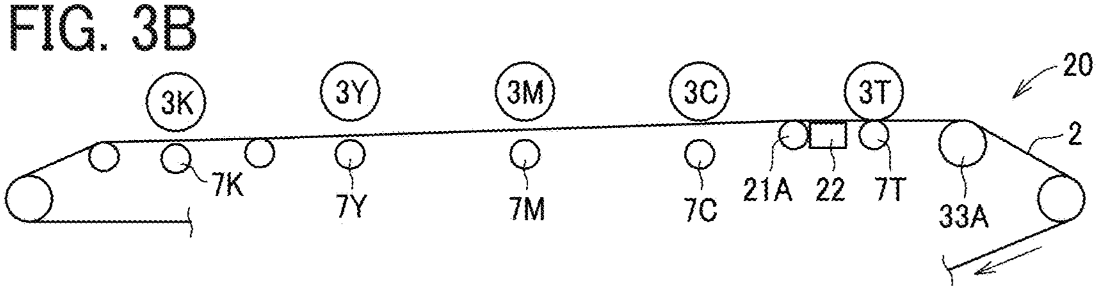
Figure 3C:
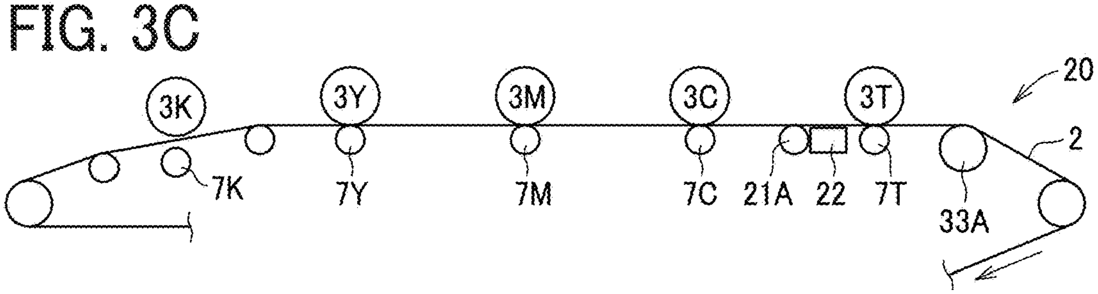
Figure 3D:
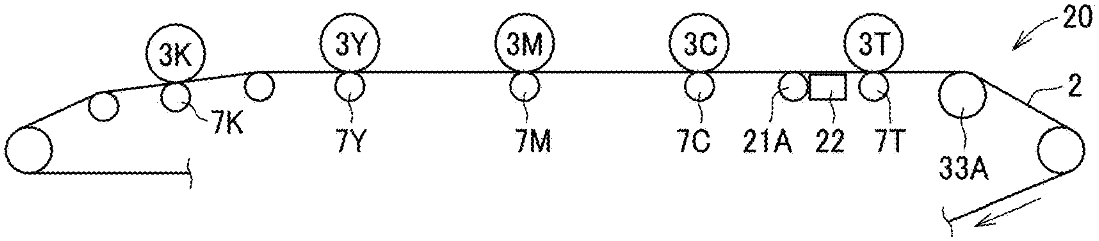
Figure 3E:
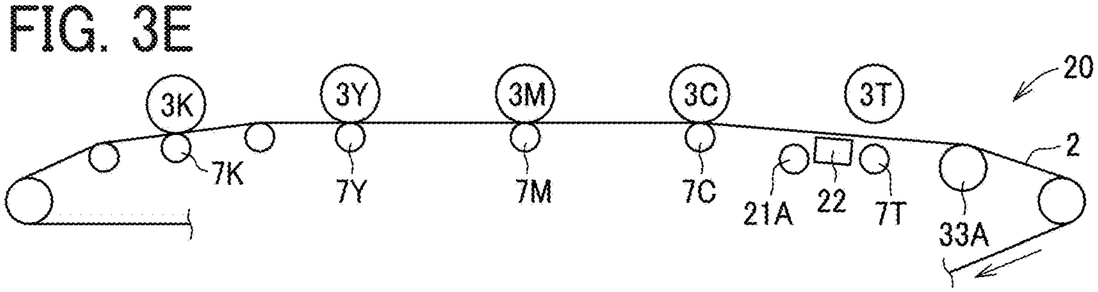
Figure 3F:
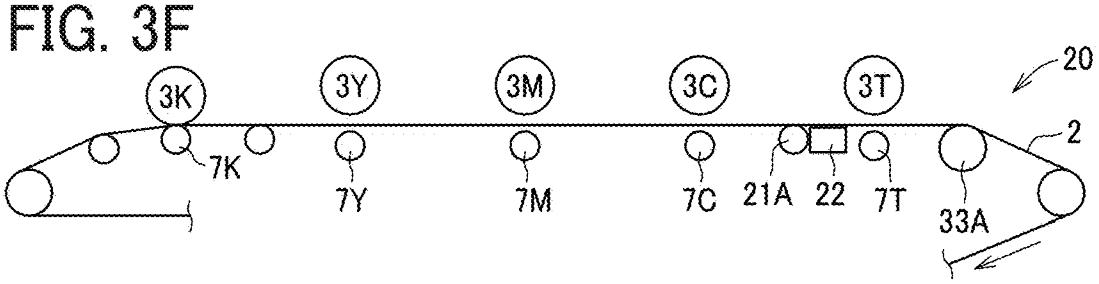

As illustrated in FIG. 2, the primary transfer roller 7T and the photoconductor 3T form a special color transfer nip NT with the intermediate transfer belt 2 interposed between the primary transfer roller 7T and the photoconductor 3T. The primary transfer roller 7C and the photoconductor 3C form a cyan transfer nip NC with the intermediate transfer belt 2 interposed between the primary transfer roller 7C and the photoconductor 3C. The primary transfer roller 7M and the photoconductor 3M form a magenta transfer nip NM with the intermediate transfer belt 2 interposed between the primary transfer roller 7M and the photoconductor 3M. The primary transfer roller 7Y and the photoconductor 3Y form a yellow transfer nip NY with the intermediate transfer belt 2 interposed between the primary transfer roller 7Y and the photoconductor 3Y. The primary transfer roller 7K and a photoconductor 3K form a black transfer nip NM with the intermediate transfer belt 2 interposed between the primary transfer roller 7K and the photoconductor 3K.

The transfer device 20 includes a most-upstream primary transfer section 201 disposed most upstream in the rotation direction of the intermediate transfer belt 2, a most-downstream primary transfer section 203 disposed most downstream in the rotation direction of the intermediate transfer belt 2, and a central primary transfer section 202 including the primary transfer rollers 7Y, 7M, and 7C disposed between the most-upstream primary transfer section 201 and the most-downstream primary transfer section 203. In the present embodiment, the most-upstream primary transfer section 201 transfers a black toner image at a black transfer nip NK, the central primary transfer section 202 transfers a cyan toner image at a cyan transfer nip NC, a magenta toner image at a magenta transfer nip NM, and a yellow toner image at a yellow transfer nip NY to the intermediate transfer belt 2. The most-downstream primary transfer section 203 transfers a special color toner image at a special color transfer nip NT to the intermediate transfer belt 2. Furthermore, in the following description, upstream or downstream in the rotation direction of the intermediate transfer belt 2 may be also referred to simply as upstream or downstream.

In FIG. 2, the primary transfer roller 7K disposed in the most-upstream primary transfer section 201 is a most-upstream primary transferor, the primary transfer rollers 7Y, 7M, and 7C disposed in the central primary transfer section 202 are central primary transferors, and the primary transfer roller 7T disposed in the most-downstream primary transfer section 203 is a most downstream primary transferor. The rotation direction of the intermediate transfer belt 2 is a direction indicated by arrow A in FIG. 2. The primary transfer rollers 7K, 7Y, 7M, and 7C upstream from the primary transfer roller 7T in the rotation direction of the intermediate transfer belt 2 are also upstream primary transferors.

In the present embodiment, a toner image of the special color can be transferred to the intermediate transfer belt 2 in both the most-upstream primary transfer section 201 and the most-downstream primary transfer section 203. Accordingly, a toner image of the special color can be transferred in a desired order. Details are described below.

Between the primary transfer roller 7C and the primary transfer roller 7T in the rotation direction of the intermediate transfer belt 2, a driven roller 21A as a second tension roller and a sensor 22 as a sensor are disposed. The driven roller 21A stretches the intermediate transfer belt 2. The sensor 22 detects a scale on the intermediate transfer belt 2 and detects the rotation speed of the intermediate transfer belt 2. Controlling the rotation speed of the intermediate transfer belt 2 based on the detection result of the sensor 22 prevents positional shift of toner images of the colors to be transferred to the intermediate transfer belt 2.

In the transfer device 20 according to the present embodiment, the multiple primary transfer rollers 7K, 7Y, 7M, 7C, and 7T contact with and separate from the photoconductors 3K, 3Y, 3M, 3C, and 3T, respectively, with the intermediate transfer belt 2 interposed between the primary transfer rollers 7K, 7Y, 7M, 7C, and 7T and the photoconductors 3K, 3Y, 3M, 3C, and 3T, respectively, in accordance with modes of image formation. Specifically, as described in modes A, B, C, D, E, and F in Table 1 given below, the position of each of the primary transfer rollers 7K, 7Y, 7M, 7C, and 7T can be changed between a contact position and a separation position. The contact position is a position at which each of the primary transfer rollers 7K, 7Y, 7M, 7C, and 7T contacts the corresponding one of the photoconductors 3K, 3Y, 3M, 3C, and 3T, via the intermediate transfer belt 2 to form a primary transfer nip. The separation position is a position at which each of the primary transfer rollers 7K, 7Y, 7M, 7C, and 7T is separated from the corresponding one of the photoconductors 3K, 3Y, 3M, 3C, and 3T. The driven roller 21A around which the intermediate transfer belt 2 is stretched and the driven roller 33A that serves as a first tension roller also move in a direction away from the photoconductor 3T in conjunction with the primary transfer roller 7T of the most-downstream primary transfer section 203, in other words, in a downward direction in FIG. 2 or in an upward direction opposite to the downward direction. The position of the primary transfer roller 7T of the most-downstream primary transfer section 203 can be changed among the following positions: the contact position at which the primary transfer roller 7T contacts the photoconductor 3T to form the primary transfer nip NT, a small separation position at which the primary transfer roller 7T is separated from the photoconductor 3T by a small separation distance, and a large separation position at which the primary transfer roller 7T is separated from the photoconductor 3T by a large separation distance. In conjunction with the primary transfer roller 7T, the driven rollers 21A and 33A also move in the upward direction in FIG. 2, which is a direction in which the driven rollers 21A and 33A approach the photoconductor 3T or in the downward direction in FIG. 2, which is a direction in which the driven rollers 21A and 33A move away from the photoconductor 3T. FIG. 2 illustrates a case of the mode D in which all the primary transfer rollers 7K, 7Y, 7M, 7C, and 7T contact with the intermediate transfer belt 2.

TABLE 1

| | A | B | C | D | E | F |
|---|---|---|---|---|---|---|
| Most-downstream primary transfer section + Driven roller | Small separation position | Contact position | Contact position | Contact position | Large separation position | Small separation position |
| Central primary transfer section | Separation position | Separation position | Contact position | Contact position | Contact position | Separation position |
| Most-upstream primary transfer Section | Separation position | Separation position | Separation position | Contact position | Contact position | Contact position |

FIGS. 3A, 3B, 3C, 3D, 3E, and 3F are diagrams illustrating the transfer device 20 that operates in the above-described modes A, B, C, D, E and F, respectively. At the separation position in each of the multiple modes A, B, C, D, E and F, the primary transfer rollers 7K, 7Y, 7M, 7C, and 7T are moved downward in each of FIGS. 3A, 3B, 3C, 3D, 3E, and 3F, such that the primary transfer rollers 7K, 7Y, 7M, 7C, and 7T are separated from the photoconductors 3K, 3Y, 3M, 3C, and 3T, respectively. Accordingly, the positions at which the intermediate transfer belt 2 is stretched by the primary transfer rollers 7K, 7Y, 7M, 7C, and 7T change. The direction indicated by the double-headed arrow B is a direction in which the intermediate transfer belt 2 contacts with and separates from the multiple photoconductors 3K, 3Y, 3M, 3C, and 3T, and is also a direction in which the multiple primary transfer rollers 7K, 7Y, 7M, 7C, and 7T contact with and separate from the photoconductors 3K, 3Y, 3M, 3C, and 3T, respectively. The driven rollers 21A and 33A move downward in FIGS. 3A, 3B, 3C, 3D, 3E, and 3F in conjunction with movement of the primary transfer roller 7T of the most-downstream primary transfer section 203 in which the primary transfer roller 7T moves away from the photoconductor 3T. The driven rollers 21A and 33A move upward in FIGS. 3A, 3B, 3C, 3D, 3E, and 3F in conjunction with the movement of the primary transfer roller 7T in which the primary transfer roller 7T approaches the photoconductor 3T. The sensor 22 moves downward in FIGS. 3A, 3B, 3C, 3D, 3E, and 3F in accordance with the movement of the primary transfer roller 7T from the contact position or the large separation position to the small separation position. Movements of, for example, the primary transfer rollers 7K, 7Y, 7M, 7C, and 7T in the above-described A, B, C, D, E and F are described below. Further, the position of the driven roller 33A indicated as the contact position in Table 1 is a first position, the position of the driven roller 33A indicated as the small separation position is a second position, and the position of the driven roller 33A indicated as the large separation position is a third position. Each of the primary transfer rollers 7K, 7Y, 7M, 7C, and 7T does not strictly move upward or downward in FIGS. 3A, 3B, 3C, 3D, 3E, and 3F.

Figure 4:
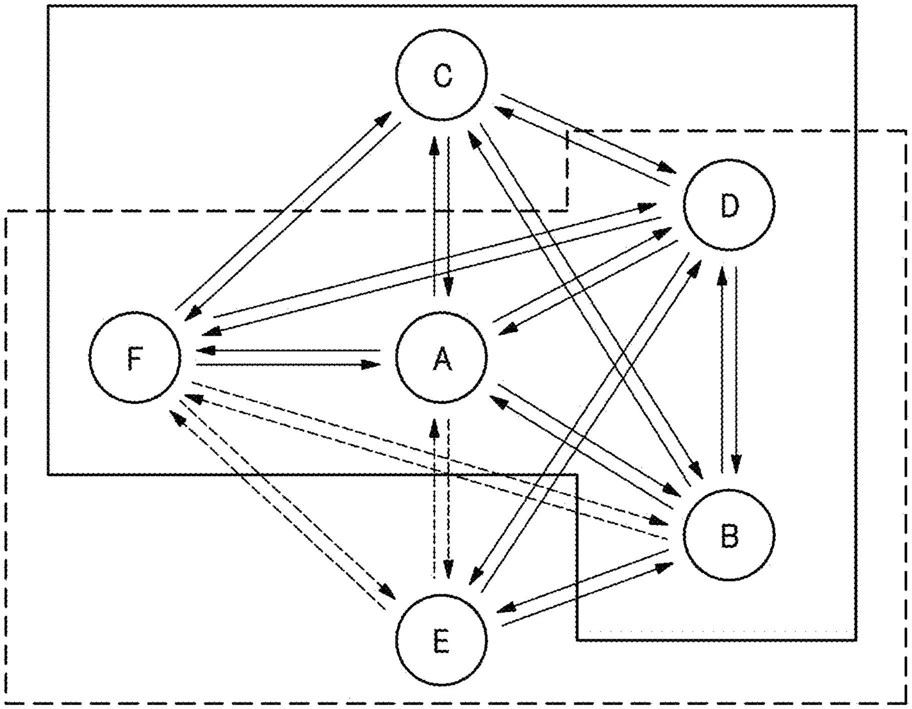
FIG. 4 is a diagram illustrating how each of the modes A, B, C, D, E and F is switched between each other, according to an embodiment of the present disclosure.

FIG. 4 is a diagram illustrating how the multiple modes A, B, C, D, E and F are switched, according to an embodiment of the present disclosure. An area surrounded by a solid line in FIG. 4 illustrates a case in which the modes A, B, C, D, and F are switched when the black (K) toner is arranged in the most-downstream primary transfer section 203. An area surrounded by a dotted line in FIG. 4 illustrates a case in which the modes A, B, D, and F are switched when the special color toner is arranged in the most-downstream primary transfer section 203. In other words, the mode C is a mode employed only when the black (K) toner is arranged in the most-downstream primary transfer section 203, the mode E is a mode employed when the special color toner is arranged in the most-downstream primary transfer section 203 and switching between the mode C and the mode E is not performed.

Switching between the modes A, B, C, D, F, and F as described above allows only the primary transfer sections to form the primary transfer nips needed for image formation. Accordingly, the primary transfer nips are not formed by the primary transfer sections that are not needed for image formation. Thus, excessive toner consumption can be prevented. For example, in the case in which a monochrome image is formed on a recording sheet, in the mode F, the black transfer nip NK is formed only in the most-upstream primary transfer section 201. In particular, in the transfer device 20 according to the present embodiment in which the special color toner is transferred in the most-upstream primary transfer section 201 and the most-downstream primary transfer section 203, the primary transfer roller 7K of the most-upstream primary transfer section 201 and the primary transfer roller 7T of the most-downstream primary transfer section 203 are contactable to and separable from the photoconductors 3K and 3T, respectively. By so doing, the primary transfer roller 7K of the most-upstream primary transfer section 201 or the primary transfer roller 7T of the most-downstream primary transfer section 203 can be separated from the photoconductor 3K, or 3T, respectively, as needed even when the special color toner is transferred either in the most-upstream primary transfer section 201 or the most-downstream primary transfer section 203. Accordingly, excessive consumption of the special color toner can be prevented in any of the modes A, B, C, D, E, and F.

When the multiple primary transfer rollers 7Y, 7M, and 7C of the central primary transfer section 202 are arranged at the respective contact positions and the primary transfer roller 7T of the most-downstream primary transfer section 203 is arranged at the separation position, as indicated in the mode E, the primary transfer roller 7T is arranged at the large separation position. Thus, the driven roller 33A around which the intermediate transfer belt 2 is stretched is largely moved in the direction away from the photoconductor 3T. As a result, the position at which the intermediate transfer belt 2 is stretched can be changed to a position away from the photoconductor 3T. Such a configuration can prevent interference between the photoconductor 3T and the intermediate transfer belt 2 and damage to the photoconductor 3T and the intermediate transfer belt 2 due to the interference.

In some switching operations among the switching operations between the modes A, B, C, D, E, and F, the order of components that contact with or separate from the intermediate transfer belt 2 is preset. Specifically, in the case in which the mode A is switched to the mode E, the primary transfer roller 7T and the driven rollers 21A and 33A are moved first to the respective large separation positions.

Then, the primary transfer rollers 7Y, 7M, and 7C of the central primary transfer section 202 are moved to the respective contact positions. By contrast, in the case in which the mode E is switched to the mode A, the primary transfer rollers 7Y, 7M, and 7C of the central primary transfer section 202 are moved first to the separation positions. Then, the primary transfer roller 7T and the driven rollers 21A and 33A are moved to the respective small separation positions. In the above-described cases, the position of the primary transfer roller 7K of the most-upstream primary transfer section 201 is switched between the separation position and the contact position at any suitable time. In the case in which the mode B is switched to the mode F, the primary transfer roller 7T and the driven rollers 21A and 33A are moved first to the small separation position. Then, the primary transfer roller 7K of the most-upstream primary transfer section 201 is moved to the contact position. By contrast, in the case in which the mode F is switched to the mode B, the primary transfer roller 7K of the most-upstream primary transfer section 201 is moved first to the separation position. Then, the primary transfer roller 7T and the driven rollers 21A and 33A are moved to the respective contact positions. In the case in which the mode E is switched to the mode F, the primary transfer rollers 7Y, 7M, and 7C of the central primary transfer section 202 are moved first to the respective separation positions. Then, the primary transfer roller 7T and the driven rollers 21A and 33A are moved to the respective small separation positions. By contrast, in the case in which the mode F is switched to the mode E, the primary transfer roller 7T and the driven rollers 21A and 33A are moved first to the large separation positions. Then, the primary transfer rollers 7Y, 7M, and 7C of the central primary transfer section 202 are moved to the contact positions. As described above, the primary transfer roller 7T and the driven rollers 21A and 33A that are moved to the separation position are moved first. Accordingly, damage to the intermediate transfer belt 2 and the photoconductors 3K, 3C, 3M, 3Y, and 3T due to the contact of the intermediate transfer belt 2 and the photoconductors 3K, 3C, 3M, 3Y, and 3T can be prevented.

In a typical configuration in which multiple primary transferors of primary transfer sections other than a primary transfer section that transfers a toner image of a transparent color are moved to contact with and separated from corresponding one of multiple photoconductors, positions at which an intermediate transferor is stretched also change according to the arrangement of the above-described primary transferors. Accordingly, even if the primary transferor of the most-downstream primary transfer section is separated from the intermediate transferor, the intermediate transferor is not appropriately separated from the latent image bearer, which may cause damage to the intermediate transferor and the latent image bearer. However, according to the present embodiment, the intermediate transfer belt 2 serving as the intermediate transferor is properly separated from the photoconductors 3K, 3C, 3M, 3Y, and 3T serving as the latent image bearers. Thus, damage to the intermediate transfer belt 2 and the photoconductors 3K, 3C, 3M, 3Y, and 3T due to the contact of the intermediate transfer belt 2 and the photoconductors 3K, 3C, 3M, 3Y, and 3T can be prevented.

In the present embodiment, as described below, the primary transfer roller 7T and the driven rollers 21A and 33A are simultaneously moved by a common moving mechanism. In some embodiments, when the primary transfer roller 7T and the driven rollers 21A and 33A are moved by a different moving mechanism, the order in which the primary transfer roller 7T and the driven rollers 21A and 33A are moved may be any desired order.

Figure 5:
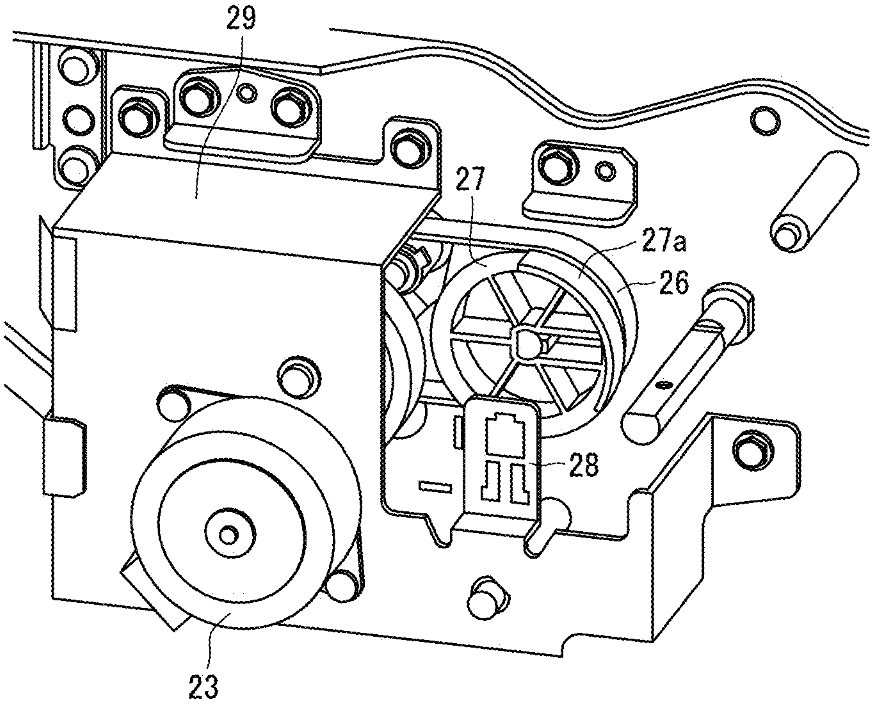
FIG. 5 is a perspective view of a driving source of a contact-and-separation mechanism as viewed from the front side of the image forming apparatus of FIG. 1, in which a primary transfer roller is arranged at a small separation position, according to an embodiment of the present disclosure.
Figure 6:
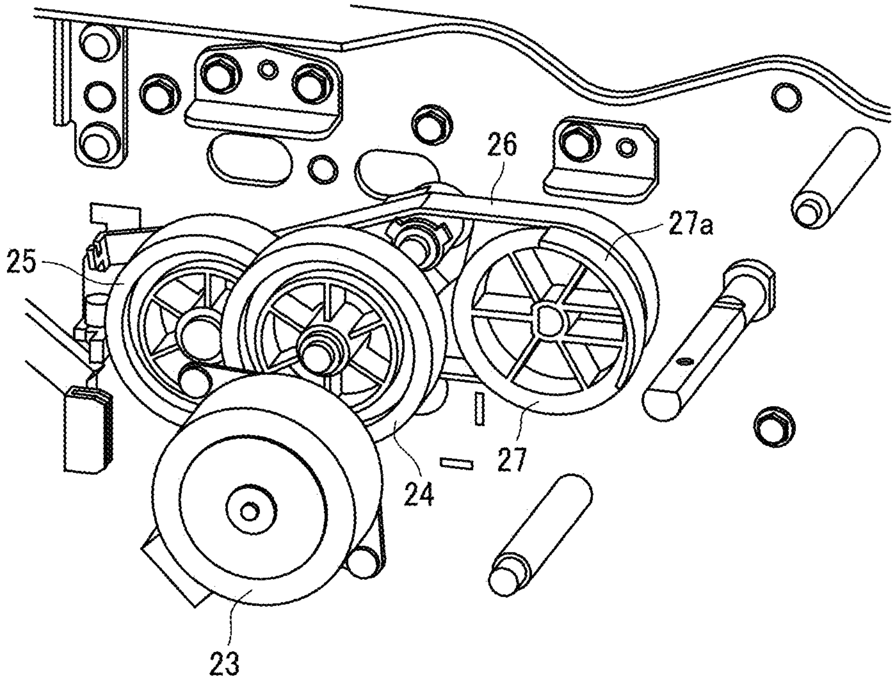
FIG. 6 is a perspective view of the driving source of the contact-and-separation mechanism of FIG. 5, in which a bracket covering a gear train is removed, according to an embodiment of the present disclosure.

A first contact-and-separation mechanism as a first movement mechanism that causes the primary transfer roller 7T disposed in the most-downstream primary transfer section 203 to contact with and separate from the intermediate transfer belt 2 is described below. First, a motor that is a driving source of the first contact-and-separation mechanism and components surrounding the motor are described with reference to FIGS. 5 and 6. FIG. 5 is a perspective view of a motor 23 and components surrounding the motor 23, according to the present embodiment. FIG. 6 is a perspective view of the motor 23 and the components surrounding the motor 23 in which a bracket 29 covering a gear train is removed, according to the present embodiment.

As illustrated in FIGS. 5 and 6, the motor 23 that is a stepping motor is connected to a two-stage gear 24. The two-stage gear 24 meshes with the motor 23 on teeth of one stage of the two-stage gear 24, and the two-stage gear 24 rotates by the output of the motor 23. Teeth of the other stage of the two-stage gear 24 mesh with teeth disposed on the shaft of a pulley 25 to transmit a driving force from the motor 23 to the pulley 25. A toothed belt 26 is wound around the pulley 25 and a feeler-equipped pulley 27. Teeth on an inner peripheral surface of the toothed belt 26 mesh with teeth on an outer peripheral surface of each of the pulley 25 and the feeler-equipped pulley 27.

The driving force of the motor 23 rotates a cam, to be described below, to cause the primary transfer roller 7T (see FIGS. 28A, 28B and 28C) to contact with or separate from the intermediate transfer belt 2. The driving force of the motor 23 is also transmitted to the feeler-equipped pulley 27 via the two-stage gear 24, the pulley 25, and the toothed belt 26 to rotate the feeler-equipped pulley 27.

A photosensor 28 (see FIG. 7) is disposed to face the feeler-equipped pulley 27. Rotation of the feeler-equipped pulley 27 changes whether a feeler 27*a* provided for the feeler-equipped pulley 27 is arranged at a position facing the photosensor 28. Thus, the feeler-equipped pulley 27 can change a condition in which the photosensor 28 detects. The photosensor 28 is attached to the bracket 29.

Figure 7:
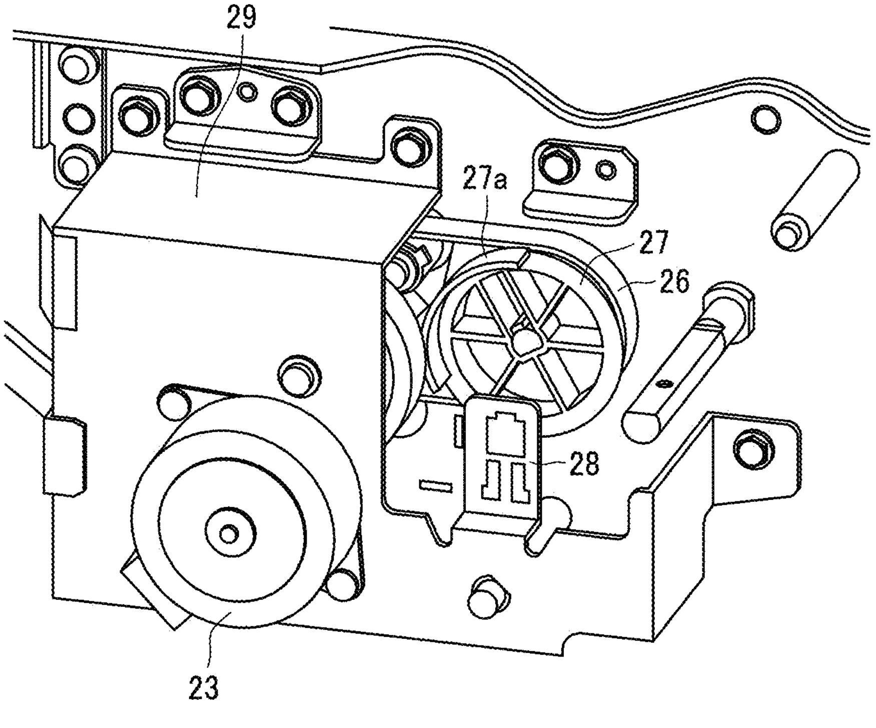
FIG. 7 is a perspective view of a driving source of a contact-and-separation mechanism as viewed from the front side of the image forming apparatus of FIG. 1, in which a primary transfer roller is arranged at a contact position, according to an embodiment of the present disclosure.
Figure 8:
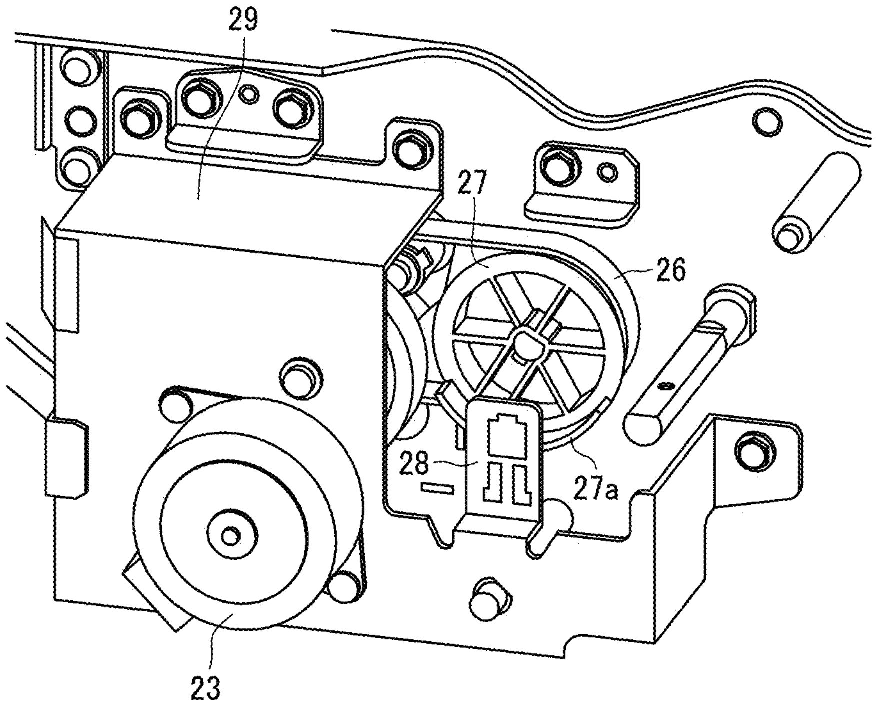
FIG. 8 is a perspective view of the driving source of the contact-and-separation mechanism of FIG. 5, viewed from the front side of the image forming apparatus of FIG. 1, in which a primary transfer roller is arranged at a large separation position, according to an embodiment of the present disclosure.

FIG. 5 illustrates a case in which the primary transfer roller 7T is arranged at the small separation position, FIG. 7 illustrates a case in which the primary transfer roller 7T is arranged at the contact position, and FIG. 8 illustrates a case in which the primary transfer roller 7T is arranged at the large separation position. The motor 23 is driven by a predetermined number of pulses to rotate the feeler 27*a* counterclockwise to cause the primary transfer roller 7T to move from the large separation position at which the feeler 27*a* faces the photosensor 28 in FIG. 8. Subsequently, the motor 23 is stopped and held in a state in which the motor 23 can be driven to cause the primary transfer roller 7T to switch to the small separation position. Subsequently, the motor 23 is driven from the position in FIG. 8 by a predetermined number of pulses to rotate the feeler 27*a* clockwise. Subsequently, the motor 23 is stopped and held in the state in which the motor 23 can be driven to cause the primary transfer roller 7T to switch to the small separation position in FIG. 7. In other words, the position of the primary transfer roller 7T can be switched to the contact position and the small separation position via the large separation position. The positions of the primary transfer roller 7T, the driven rollers 21A and 33A, and the sensor 22 are switched between the small separation position, the contact position, and the large separation position by the driving force of the single motor 23.

Figure 9:
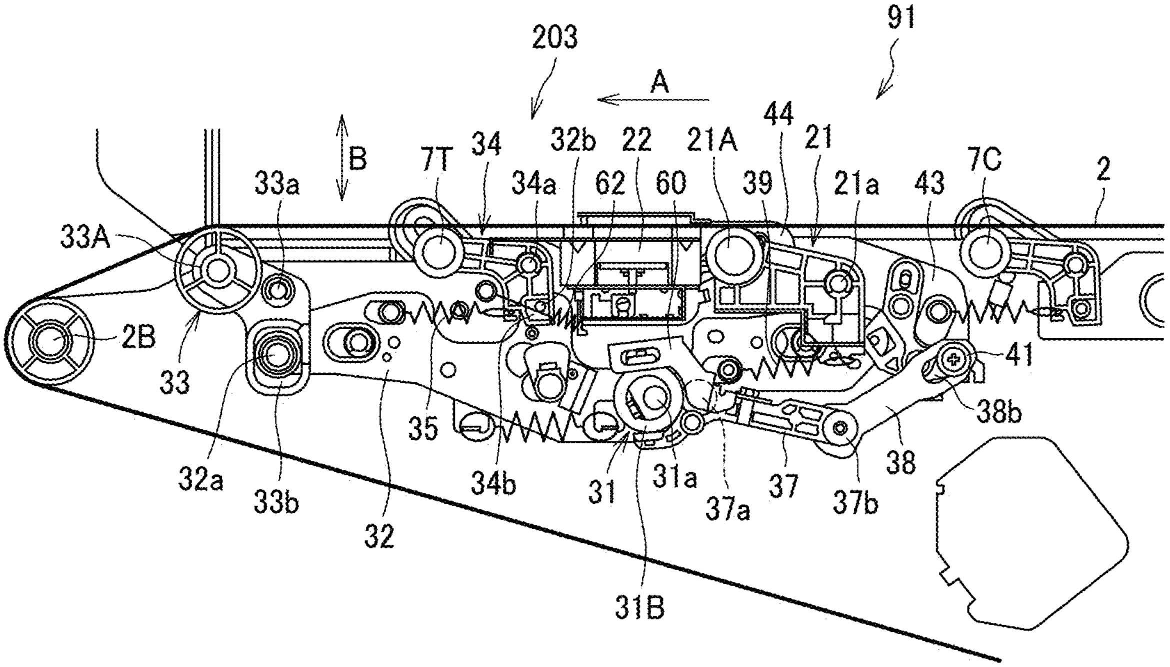
FIG. 9 is a cross-sectional view of a contact-and-separation mechanism viewed from the back side of the image forming apparatus of FIG. 1, in which a primary transfer roller of a most-downstream primary transfer section is arranged at a contact position relative to an intermediate transfer belt, according to an embodiment of the present disclosure.

A first contact-and-separation mechanism 91 that causes the primary transfer roller 7T, the driven roller 21A, and the driven roller 33A to operate by the driving force of the motor 23 is described below with reference to FIG. 9. FIG. 9 is a cross-sectional view of the first contact-and-separation mechanism 91 viewed from a rear side of the image forming apparatus 1, which is an opposite side to the image forming apparatus 1 in, for example, FIG. 1.

As illustrated in FIG. 9, the first contact-and-separation mechanism 91 includes a cam 31 to which the driving force of the above-described motor 23 is transmitted. The cam 31 includes a first cam 31A (see FIG. 12) and a second cam 31B and is rotatable about a rotation shaft 31*a*. The second cam 31B is a ball bearing having an outer ring. The second cam 31B is eccentric with respect to the rotation shaft 31*a*.

The first cam 31A contacts a front slider 32 serving as a slider. As illustrated in FIG. 9, the front slider 32 is biased toward the left direction in FIG. 9 by springs. The driving force of the motor 23 causes the first cam 31A to rotate to change a surface of the first cam 31A that contacts the front slider 32. By so doing, the front slider 32 can move toward the right direction in FIG. 9 against the biasing force of the springs.

The driven roller 33A, which is one of rollers around which the intermediate transfer belt 2 is stretched, is disposed at one end of the rotator 33. The rotator 33 is rotatable about a rotation fulcrum 33*a*. The rotator 33 includes a hole 33*b* at an end of the rotator 33 opposite to another end of the rotator 33 on which the driven roller 33A is disposed. An insertion portion 32*a* disposed on the front slider 32 is inserted into the hole 33*b*. The insertion portion 32*a* is formed by press-fitting a ball bearing into a shaft fixed to the front slider 32. Providing the ball bearings in the insertion portion 32*a* can reduce sliding resistance between the insertion portion 32*a* and the rotator 33. The primary transfer roller 7T is disposed at one end of a rotator 34. The rotator 34 is rotatable about a rotation fulcrum 34*a*. The rotator 34 includes a hole 34*b* at an end of the rotator 34 opposite to another end of the rotator 34 on which the primary transfer roller 7T is disposed. A pin 32*b* disposed on the front slider 32 is inserted into the hole 34*b*. A spring 35 is fixed to a housing of the image forming apparatus 1 and biases the rotator 34 in a direction in which the rotator 34 rotates clockwise in FIG. 9 about the rotation fulcrum 34*a*. The driven roller 33A is the first tension roller disposed downstream from the primary transfer roller 7T of the most-downstream primary transfer section 203 in the rotation direction of the intermediate transfer belt 2.

When the front slider 32 moves in the left-right direction in FIG. 9, the insertion portion 32*a* presses the rotator 33 to cause the rotator 33 to rotate about the rotation fulcrum 33*a*. Accordingly, the position of the driven roller 33A is changed. Further, when the front slider 32 moves in the right direction in FIG. 9, the rotator 34 is pressed by the pin 32*b* and rotates counterclockwise in FIG. 9 about the rotation fulcrum 34*a* against the biasing force of the spring 35. Alternatively, when the front slider 32 moves in the left direction in FIG. 9, the rotator 34 rotates clockwise in FIG. 9 about the rotation fulcrum 34*a* by the biasing force of the spring 35. Thus, the primary transfer roller 7T disposed on the rotator 34 contacts with and separates from the photoconductor 3T.

As illustrated in FIG. 9, the driven roller 21A around which the intermediate transfer belt 2 is stretched is disposed and driven by the rotation of the intermediate transfer belt 2. The driven roller 21A is disposed upstream from the primary transfer roller 7T and downstream from the primary transfer roller 7C immediately upstream from the primary transfer roller 7T in the rotation direction of the intermediate transfer belt 2. The driven roller 21A is disposed at one end of the rotator 21. The rotator 21 is rotatable about a rotation fulcrum 21*a*. The rotator 21 receives a force from a spring 39 acting in a direction such that the rotator 21 rotates clockwise about the rotation fulcrum 21*a*.

In FIG. 9, the primary transfer roller 7T of the most-downstream primary transfer section 203 is arranged at the contact position. Under the above conditions, the front slider 32 is arranged at a leftmost position in FIG. 9 compared with the above-described other two positions at which the front slider 32 is arranged in FIG. 10 and FIG. 11. When the first cam 31A (see FIG. 12) is rotated to a predetermined position to cause the primary transfer roller 7T of the most-downstream primary transfer section 203 to be arranged at the small separation position, the front slider 32 moves to the right from the position of the front slider 32 in FIG. 9 to the position of the front slider 32 in FIG. 10. Further, when the first cam 31A is rotated to a predetermined position to cause the primary transfer roller 7T of the most-downstream primary transfer section 203 to be arranged at the large separation position, the front slider 32 moves to the right from the position of the front slider 32 in FIGS. 9 and 10 to the position of the front slider 32 in FIG. 11.

Figure 10:
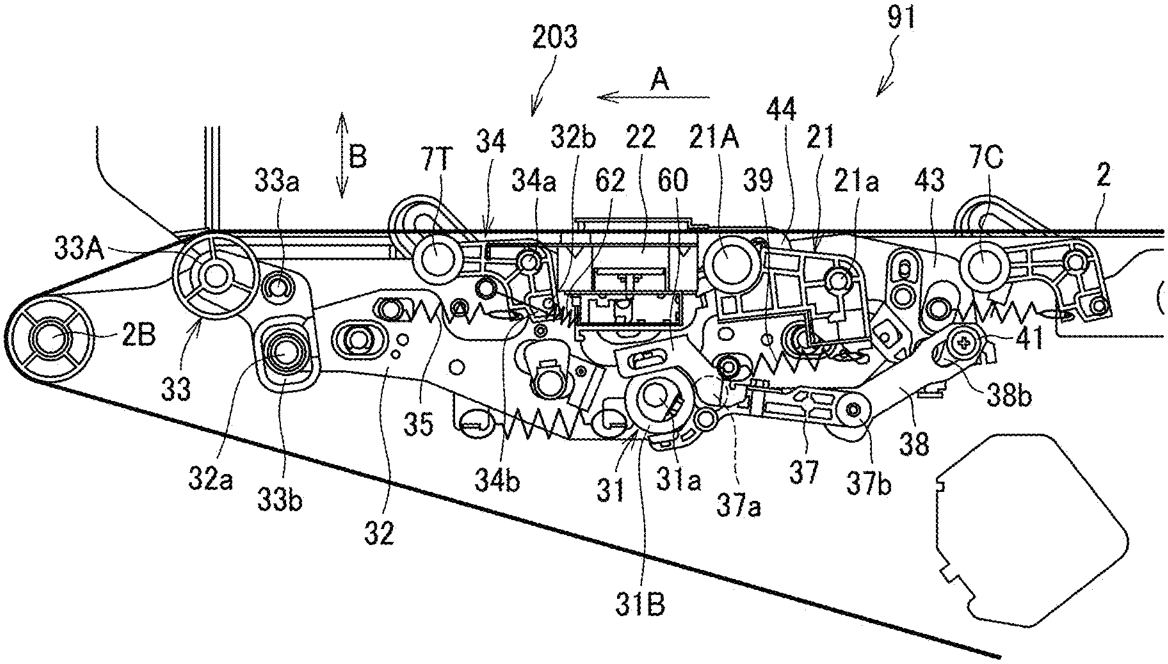
FIG. 10 is a cross-sectional view of the contact-and-separation mechanism of FIG. 9, in which the primary transfer roller of the most-downstream primary transfer section is arranged at a small separation position relative to the intermediate transfer belt, according to an embodiment of the present disclosure.
Figure 11:
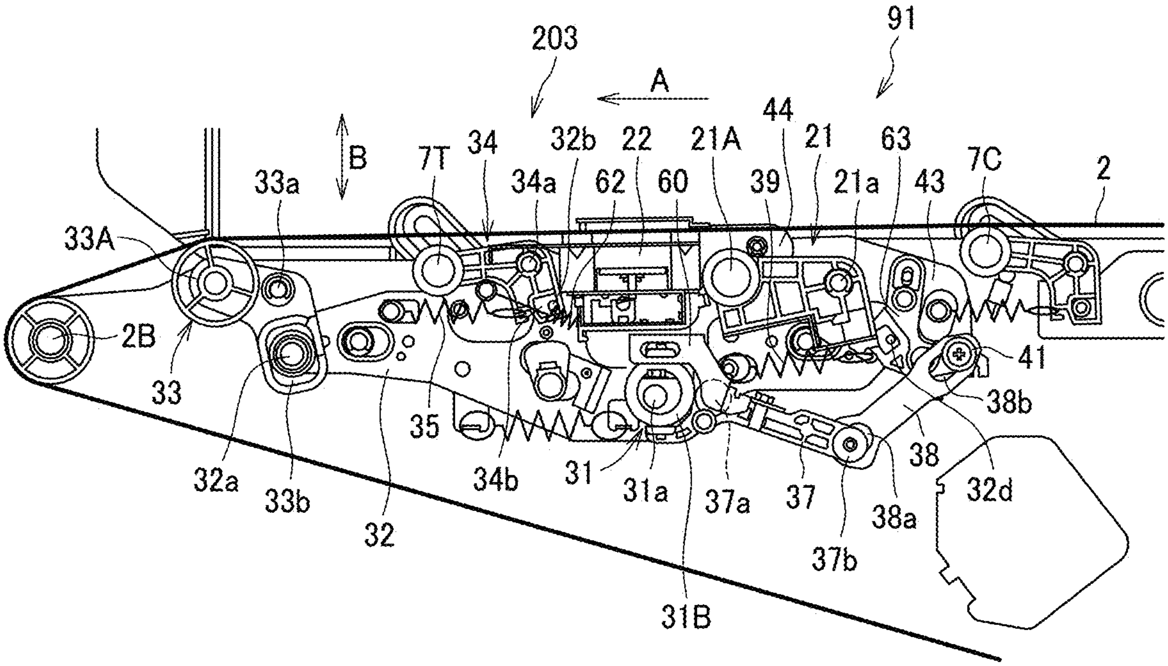
FIG. 11 is a cross-sectional view of the contact-and-separation mechanism of FIG. 9, in which the primary transfer roller of the most-downstream primary transfer section is arranged at a large separation position relative to the intermediate transfer belt, according to an embodiment of the present disclosure.

For example, as illustrated in FIGS. 9, 10, and 11 in the order listed, when the front slider 32 moves in the right direction in FIG. 9, the rotator 34 rotates counterclockwise about the rotation fulcrum 34*a* against the biasing force of the spring 35, and the primary transfer roller 7T moves in the direction away from the photoconductor 3T. When the primary transfer roller 7T is arranged at the small separation position in FIG. 10 and at the large separation position in FIG. 11, the primary transfer roller 7T is separated from the photoconductor 3T. When the front slider 32 moves in the right direction in FIG. 9, the rotator 33 rotates counterclockwise about the rotation fulcrum 33*a* and the driven roller 33A moves in a direction away from the intermediate transfer belt 2. The driven roller 33A stretches the intermediate transfer belt 2 in all the configurations of FIGS. 9, 10, and 11. However, the position at which the driven roller 33A stretches the intermediate transfer belt 2 moves farther away from the photoconductor 3T, which is the upper side of FIGS. 9, 10, and 11, in the order of FIGS. 9, 10, and 11. When the front slider 32 moves in the right direction in FIG. 9, a pin 32*c* (see FIG. 15) disposed on the front slider 32 presses a side of the rotator 21 opposite to another side of the rotator 21 on which the driven roller 21A is disposed. Accordingly, the rotator 21 rotates counterclockwise about the rotation fulcrum 21*a* against the biasing force of the spring 39. Thus, the driven roller 21A moves away from the intermediate transfer belt 2 in FIGS. 10 and 11.

As described above, the position of the driven roller 33A is changed in accordance with states in which the primary transfer roller 7T is arranged: the contact position, the small separation position, or the large separation position. Accordingly, the position at which the driven roller 33A stretches the intermediate transfer belt 2 can be changed depending on the state in which the primary transfer roller 7T is arranged at the contact position, the small separation position, or the large separation position. As a result, the driven roller 33A can stretch the intermediate transfer belt 2 at a favorable position, and the rotation speed of the intermediate transfer belt 2 can be accurately detected by the sensor 22. In particular, in the present embodiment, the driven roller 33A is disposed downstream from the primary transfer roller 7T of the most-downstream primary transfer section 203.

Accordingly, changing the position at which the driven roller 33A stretches the intermediate transfer belt 2 in all of the above-described three states in which the primary transfer roller 7T, the shape of the intermediate transfer belt 2 in which the intermediate transfer belt 2 is stretched in each of the three states can be appropriately changed. Accordingly, the sensor 22 can accurately detect the rotation speed of the intermediate transfer belt 2. Furthermore, specifically in the above-described mode E in which the primary transfer roller 7T is arranged at the large separation position, the rotator 33 is largely rotated counterclockwise in FIG. 11 to move the driven roller 33A in the direction away from the photoconductor 3T. By so doing, the position at which the intermediate transfer belt 2 is stretched by the driven roller 33A can be shifted downward in FIG. 11. In the mode E, the primary transfer rollers 7Y, 7M, and 7C of the central primary transfer section 202 contact the intermediate transfer belt 2 to lift the intermediate transfer belt 2. As a result, the intermediate transfer belt 2 is located at a position closer to the photoconductor 3T. As described above, the position at which the intermediate transfer belt 2 is stretched by the driven roller 33A is shifted downward in FIG. 11. By so doing, the photoconductor 3T (see FIG. 2) and the intermediate transfer belt 2 can be prevented from being damaged due to interference between the photoconductor 3T and the intermediate transfer belt 2.

A mechanism for moving the sensor 22 among mechanisms included in the first contact-and-separation mechanism 91 is described below.

As illustrated in FIG. 9, an outer circumferential surface of the second cam 31B disposed in the cam 31 is held by a first arm 37 serving as a first link member or a second transmitter. The first arm 37 is rotatable about a rotation fulcrum 37*a*. The rotation fulcrum 37*a* is fixed to the front slider 32 via a ball bearing. As illustrated in FIG. 9, the rotation of the second cam 31B causes the first arm 37 to rotate about the rotation fulcrum 37*a*. In addition, as the front slider 32 moves by rotation of the first cam 31A (see FIG. 12) disposed in the cam 31, the first arm 37 moves in the left-right direction in FIG. 9.

Figure 12:
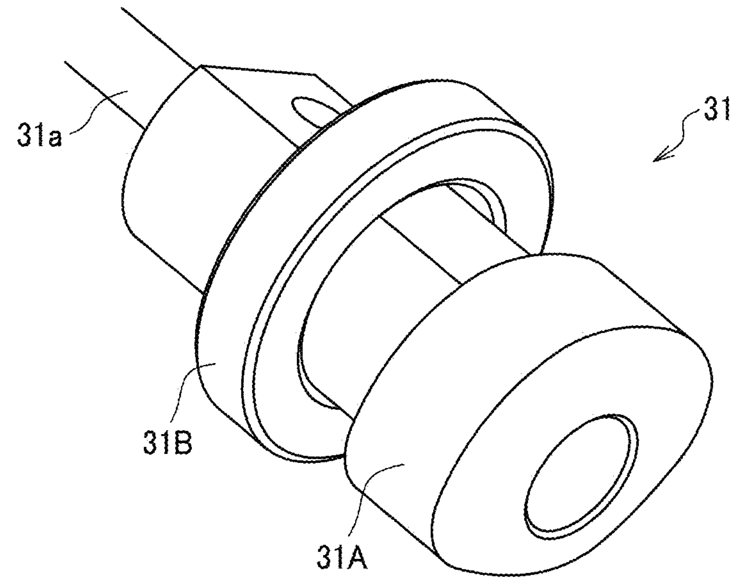
FIG. 12 is a perspective view of a cam according to an embodiment of the present disclosure.
Figure 13:
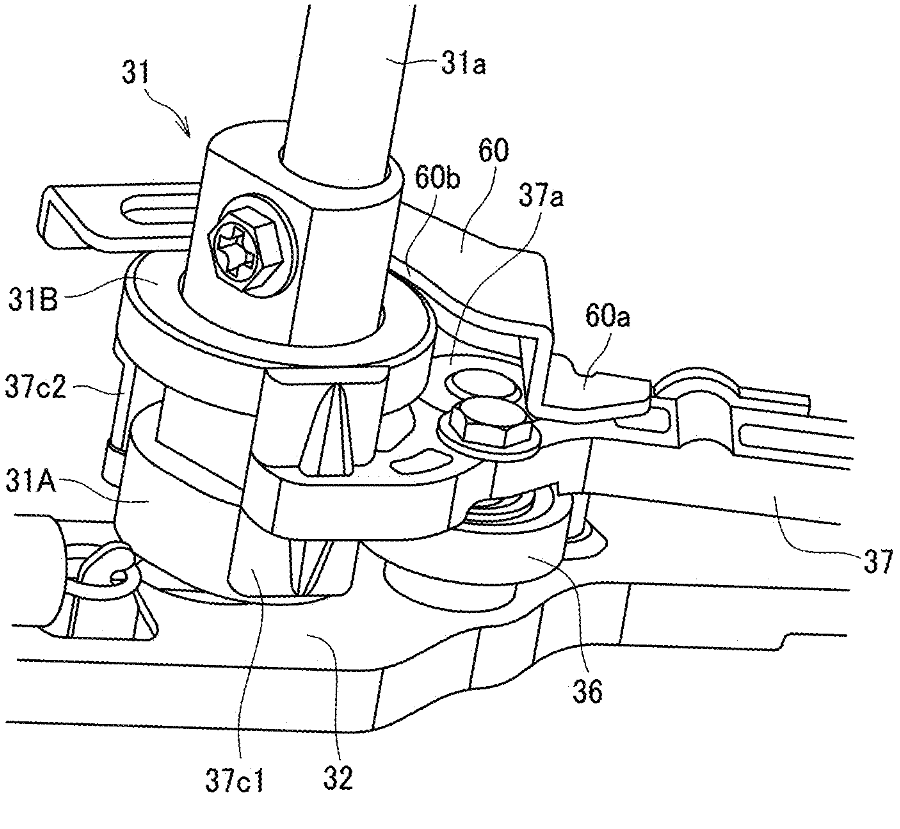
FIG. 13 is a perspective view of a cam and components around the cam viewed from the back side of FIG. 12, according to an embodiment of the present disclosure.

FIG. 12 is a perspective view of the cam 31 according to the present embodiment. As illustrated in FIG. 12, the cam 31 includes the first cam 31A and the second cam 31B. The cam 31 is rotatable about the rotation shaft 31*a*. The first cam 31A includes a small-diameter portion, a medium-diameter portion, and a large-diameter portion each having a different diameter by 120 degrees. As illustrated in FIG. 13, the first cam 31A is in contact with a cam follower 36 formed of a ball bearing. The cam follower 36 is a first transmitter provided for the first arm 37. The rotation of the first cam 31A changes a surface of the first cam 31A that contacts the cam follower 36. By so doing, the front slider 32 can be moved in the left-right direction in FIG. 9. In addition, when the front slider 32 moves, the first arm 37 with the rotation fulcrum 37*a* fixed to the front slider 32 moves in the left-right direction in FIG. 9 in conjunction with the movement of the front slider 32.

Figure 14:
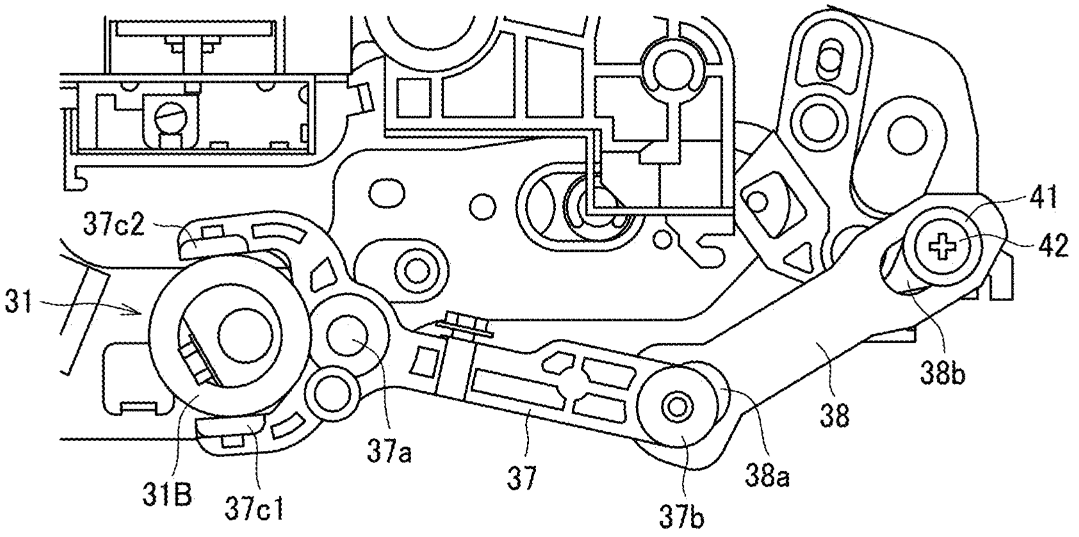
FIG. 14 is a plan view of a configuration around a first arm and a second arm according to an embodiment of the present disclosure.

As illustrated in FIGS. 13 and 14, the first arm 37 holds the second cam 31B at two positions at which handle 37*c*1 and a handle 37*c*2 are disposed. The rotation of the second cam 31B causes the first arm 37 to rotate about the rotation fulcrum 37*a*.

As illustrated in FIG. 13, a thrust stopper 60 that serves as a restrictor and a slip-off stopper is attached to the first arm 37. The thrust stopper 60 includes a contact portion 60*a* and a restricting portion 60*b* as slip-off stoppers. Bringing the contact portion 60*a* into contact with the rotation fulcrum 37*a* of the first arm 37 from above in FIG. 13 prevents the rotation fulcrum 37*a* from coming off the front slider 32. FIG. 14 is a side view of the first arm 37 in which the thrust stopper 60 is removed from the first arm 37, according to the present embodiment. The thrust stopper 60 also contacts the rotation fulcrum 37*a* from the lower side in FIG. 13 to prevent the rotation fulcrum 37*a* from coming off in a downward direction in FIG. 13. The restricting portion 60*b* of the thrust stopper 60 is a surface of the thrust stopper 60 provided along the outer peripheral surface of the outer ring disposed on the second cam 31B as the ball bearing. The restricting portion 60*b* regulates the position of the outer peripheral surface of the second cam 31B. Accordingly, a direction in which the first arm 37 moves relative to the second cam 31B can be restricted. In other words, the first arm 37 can be restricted from moving in a direction along the outer peripheral surface of the second cam 31B, for example, in a direction in which the first arm 37 slides toward the second cam 31B. Accordingly, the position of the first arm 37, such as inclination of the first arm 37 with respect to the second cam 31B can be prevented from being shifted, and wear of the handles 37*c*1 and 37*c*2 can be prevented.

In the present embodiment, the contact portion 60*a* that functions as the slip-off stopper to prevent the first arm 37 from coming off the front slider 32 and the regulating portion 60*b* that regulates the direction in which the first arm 37 moves relative to the second cam 31B are integrated with the thrust stopper 60. Accordingly, the number of components of the transfer device 20 can be reduced. However, the contact portion 60*a* and the regulating portion 60*b* may be disposed as separate components.

Figure 15:
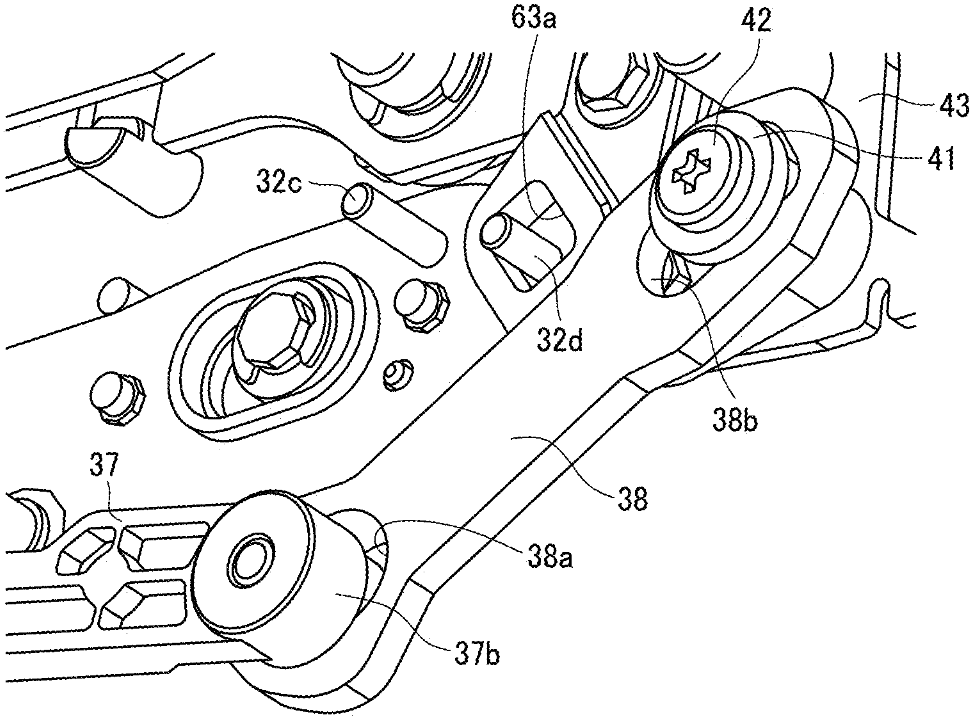
FIG. 15 is a perspective view of the second arm of FIG. 14 and components around the second arm, according to an embodiment of the present disclosure.
Figure 16:
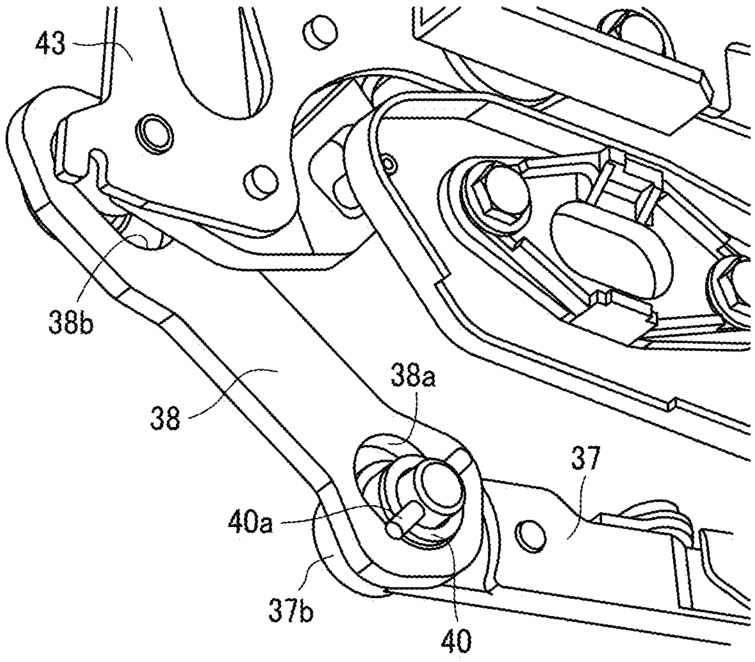
FIG. 16 is a perspective view of the second arm of FIG. 14 and components around the second arm viewed from the back side of FIG. 15, according to an embodiment of the present disclosure.

FIG. 15 is a perspective view of the first arm 37, a second arm 38, and components around the first arm 37 and the second arm 38 viewed from a front side of the image forming apparatus 1, according to the present embodiment. FIG. 16 is a perspective view of the first arm 37, the second arm 38, and components around the first arm 37 and the second arm 38 viewed from a rear side of the image forming apparatus 1, according to the present embodiment.

As illustrated in FIG. 15, the second arm 38 that serves as a second link member includes an elongated hole 38*a* and an elongated hole 38*b* at each of both ends of the second arm 38. An end 37*b* of the first arm 37 is inserted into the elongated hole 38*a* of the second arm 38. As illustrated in FIG. 16, the end 37*b* of the first arm 37 includes a bearing 40. The bearing 40 is disposed to be movable in the elongated hole 38*a* in a longitudinal direction of the elongated hole 38*a*. The bearing 40 serves as an insertion portion through which the elongated hole 38*a* is inserted.

The bearing 40 includes a parallel pin 40*a* that serves as a slip-off stopper in a rear portion of the bearing 40. The length of the parallel pin 40*a* is set to be shorter than the length of the elongated hole 38*a* in the longitudinal direction of the elongated hole 38*a*. Arranging the parallel pin 40*a* substantially parallel to the longitudinal direction of the elongated hole 38*a* allows the bearing 40 to be inserted into the elongated hole 38*a*. As described above, in the three states in which the primary transfer roller 7T is arranged at the contact position, the small separation position, and the large separation position, the parallel pin 40*a* does not rotate to a position at which the parallel pin 40*a* is parallel to the longitudinal direction of the elongated hole 38*a*. Accordingly, the parallel pin 40*a* functions as the slip-off stopper to prevent the bearing 40 from coming off the elongated hole 38*a*.

As illustrated in FIG. 15, a bearing 41 is inserted into the elongated hole 38*b*. The bearing 41 is fixed to a first sensor bracket 43 as a holder by a step screw 42. The bearing 41 is movable in the elongated hole 38*b*. The bearing 41 serves as an insertion portion through which the elongated hole 38*b* is inserted.

Rotation of the cam 31 causes the front slider 32 to be moved from the position of the front slider 32 in FIG. 9 or FIG. 10 to the right side of FIG. 10 to cause the primary transfer roller 7T of the most-downstream primary transfer section 203 to move to the large separation position. By so doing, the second cam 31B rotates to cause the first arm 37 to rotate clockwise about the rotation fulcrum 37*a*. Accordingly, the end 37*b* of the first arm 37 moves downward in FIG. 9 or 10. Accordingly, as illustrated in FIG. 11, the end 37*b* moves to an end of the elongated hole 38*a* in the longitudinal direction and contacts a wall surface forming the elongated hole 38*a* to pull the second arm 38 in a lower left direction in FIG. 11. Accordingly, the bearing 41 move to an end of the elongated hole 38*b* in the longitudinal direction and contact a wall surface forming the elongated hole 38*b*. Then, the second arm 38 pulls the first sensor bracket 43 in the lower left direction in FIG. 11.

Figure 17:
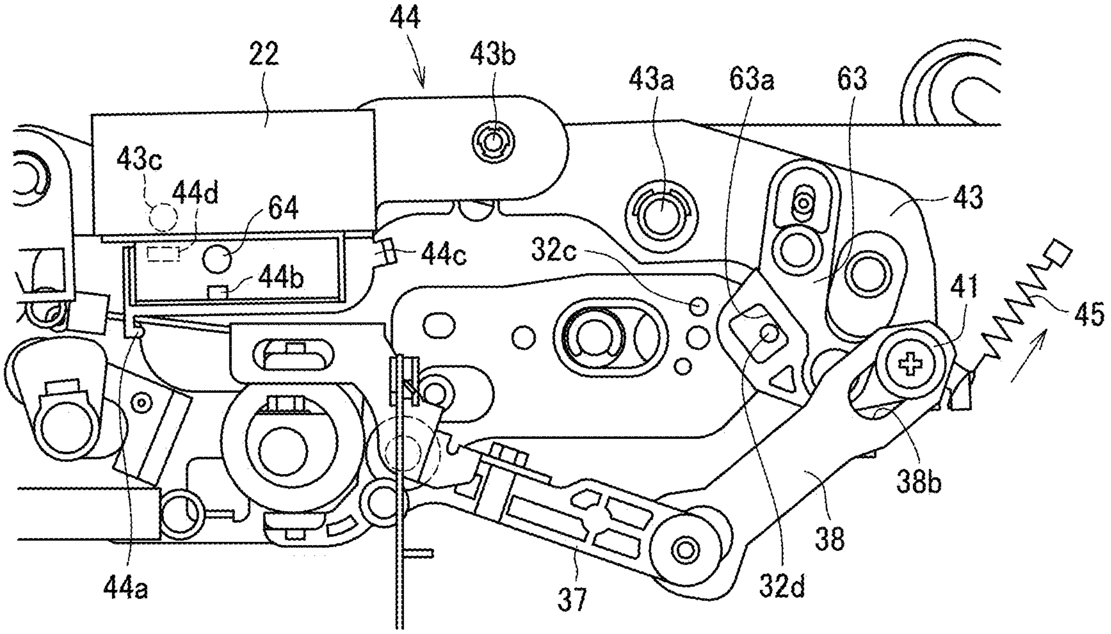
FIG. 17 is a plan view of a configuration around a first sensor bracket and a sensor, according to an embodiment of the present disclosure.

FIG. 17 is a diagram illustrating a configuration or structure around the first sensor bracket 43 and a sensor 22 and is a diagram in which the rotator 21 is removed from FIG. 9, according to the present embodiment. In FIG. 17, the sensor 22 and a second sensor bracket 44 are illustrated in a simplified manner for the sake of convenience.

As illustrated in FIG. 17, the first sensor bracket 43 is rotatable about the rotation fulcrum 43*a*. The first sensor bracket 43 receives a force from the spring 45 fixed to the housing of the image forming apparatus 1 in a direction in which the first sensor bracket 43 rotates counterclockwise in FIG. 17 about the rotation fulcrum 43*a*. A restrictor 63 is fixed to the first sensor bracket 43. The pin 32*d* of the front slider 32 is inserted into a hole 63*a* of the restrictor 63. When the primary transfer roller 7T of the most-downstream primary transfer section 203 is arranged at the contact position in FIG. 9 and at the small separation state in FIG. 10, the pin 32*d* contacts a wall surface forming walls of the hole 63*a*. By so doing, the front slider 32 applies a force to the first sensor bracket 43 such that the first sensor bracket 43 rotates clockwise about the rotation fulcrum 43*a* in FIG. 17.

The second sensor bracket 44 is fixed to the first sensor bracket 43 via a stud 43*b* disposed on the first sensor bracket 43. The second sensor bracket 44 holds the sensor 22. The second sensor bracket 44 includes a hook 44*a* to which one end of a spring 62 (see FIG. 9) is attached, a first contact portion 44*b*, and a second contact portion 44*c*.

When the primary transfer roller 7T of the most-downstream primary transfer section 203 is arranged at the contact position in FIG. 9, the second sensor bracket 44 is biased by the spring 62 to move in a direction in which the second sensor bracket 44 rotates clockwise about the rotation fulcrum 43*a* and is positioned at a position at which the first contact portion 44*b* contacts a stud 64 disposed on the housing of the image forming apparatus 1.

Figure 18:
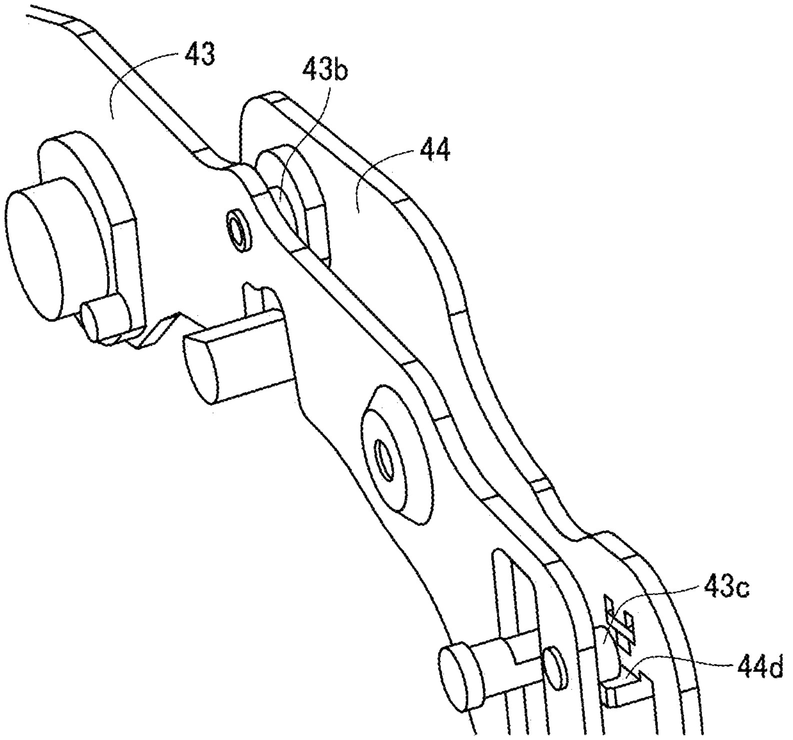
FIG. 18 is a perspective view of a first sensor bracket and a second sensor bracket as viewed from the front side of the image forming apparatus of FIG. 1, according to an embodiment of the present disclosure.

On the other hand, in the state in which the primary transfer roller 7T of the most-downstream primary transfer section 203 is arranged at the small separation position in FIG. 10, the pin 32*d* disposed on the front slider 32 moves to the right side of FIG. 9. By so doing, the first sensor bracket 43, the second sensor bracket 44, and the sensor 22 receive a force to rotate counterclockwise about the rotation fulcrum 43*a* due to their own weight and the biasing force of the spring 45. A pin 43*c* disposed on the first sensor bracket 43 illustrated in FIG. 18 presses a bent portion 44*d* of the second sensor bracket 44, and the second sensor bracket 44 receives a force such that the second sensor bracket 44 rotates counterclockwise about the rotation fulcrum 43*a* in FIG. 10. Accordingly, the first sensor bracket 43, the second sensor bracket 44, and the sensor 22 rotate counterclockwise in FIG. 10 and move downward in FIG. 10, which is a direction away from the photoconductor 3 as compared with FIG. 9. Note that FIG. 18 is a perspective view of the first sensor bracket 43 and the second sensor bracket 44 viewed from the back side of the sheet surface of FIG. 10.

Figure 19:
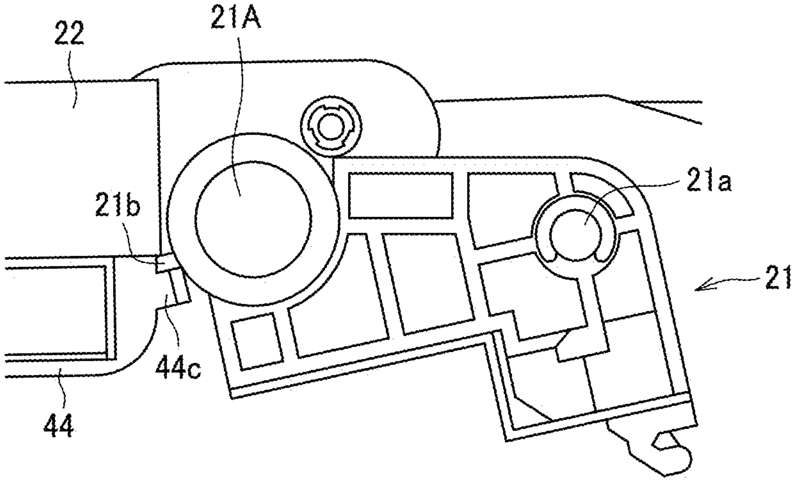
FIG. 19 is a plan view of a second sensor bracket and a rotator in which the second sensor bracket is arranged when the primary transfer roller is arranged at the large separation position, according to an embodiment of the present disclosure.

When the primary transfer roller 7T of the most-downstream primary transfer section 203 is arranged at the large separation position in FIG. 11, the pin 32*d* is further moved rightward to release a force of the pin 32*d* pressing the restrictor 63 leftward in FIG. 17 as illustrated in FIG. 17. At the same time, the second arm 38 pulls the first sensor bracket 43 in a lower left direction in FIG. 17 as described above to rotate the first sensor bracket 43 clockwise about the rotation fulcrum 43*a* in FIG. 17. Accordingly, the second sensor bracket 44 fixed to the first sensor bracket 43 via the stud 43*b* moves upward in FIG. 17, and the sensor 22 also moves upward in FIG. 17. At this time, as illustrated in FIG. 19, the second sensor bracket 44 is positioned at a position at which the second contact portion 44*c* of the second sensor bracket 44 contacts a positioning portion 21*b* of the rotator 21. In other words, the upward movement of the second sensor bracket 44 and the sensor 22 in FIG. 17 is restricted, and the sensor 22 is positioned. In the present embodiment, the above-described position at which the sensor 22 is positioned is a position lower than a position of the sensor 22 when the primary transfer roller 7T of the most-downstream primary transfer section 203 is arranged at the contact position in FIG. 9 and upper than the position of the sensor 22 when the primary transfer roller 7T of the most-downstream primary transfer section 203 is arranged at the small separation position in FIG. 10.

As described above, the driving force of the cam 31 is transmitted to the first sensor bracket 43 via the link members such as the first arm 37 and the second arm 38 to rotate the first sensor bracket 43. By so doing, the first sensor bracket 43 can be rotated in a desired direction.

In particular, in the present embodiment, the rotational force of the first arm 37 is transmitted to the second arm 38 only when a predetermined condition is satisfied. Accordingly, the driving force by the rotation of the cam 31 to the sensor 22 can be transmitted only when a specific positional change is performed. To be more specific, the second arm 38 is connected to the first arm 37 and the first sensor bracket 43 via the elongated holes 38*a* and 38*b*, respectively, disposed in the second arm 38. Accordingly, the second arm 38 can be retracted to move the sensor 22 downward, for example, in FIG. 11 only when the primary transfer roller 7T of the most-downstream primary transfer section 203 is arranged at the large separation position. In other words, compared with the primary transfer roller 7T and the driven rollers 21A and 33A that move in a constant direction with the movement of the front slider 32, the sensor 22 moves upward in FIG. 10 when the primary transfer roller 7T of the most-downstream primary transfer section 203 moves from the contact position to the small separation position and moves downward. Alternatively, the sensor 22 moves downward, for example, in FIG. 11 when the primary transfer roller 7T of the most-downstream primary transfer section 203 moves from the contact position to the large separation position or from the small separation position to the large separation position. Thus, the sensor 22 moves in a direction opposite to the direction in which the front slider 32 moves. When the primary transfer roller 7T of the most-downstream primary transfer section 203 is arranged at the small separation position, the primary transfer roller 7K of the most-upstream primary transfer section 201 and the primary transfer rollers 7Y, 7M, and 7C of the central primary transfer section 202 separate from the photoconductors 3K, 3Y, 3M, and 3C, respectively. As a result, the position at which the intermediate transfer belt 2 is stretched moves downward in FIG. 10. On the other hand, when the primary transfer roller 7T of the most-downstream primary transfer section 203 is arranged at the large separation position, the primary transfer rollers 7Y, 7M, and 7C of the central primary transfer section 202 contact the photoconductors 3Y, 3M, and 3C, respectively, via the intermediate transfer belt 2. As a result, the position at which the intermediate transfer belt 2 is stretched is pushed upward in FIG. 11. Accordingly, changing the position of the sensor 22 as described above allows the sensor 22 to be positioned at a favorable position corresponding to the position at which the intermediate transfer belt 2 is stretched. Accordingly, in each of the modes A, B, C, D, E, and F, the detection accuracy of the sensor 22 with respect to the intermediate transfer belt 2 can be enhanced, and the traveling speed of the intermediate transfer belt 2 can be controlled with high accuracy. Further, the first contact-and-separation mechanism 91 can perform the operation of the sensor 22 and the operations of the primary transfer roller 7T and the driven rollers 21A and 33A by the driving force of the motor 23 as a single driving source. Accordingly, energy saving and a reduction in the number of components of the transfer device 20 can be achieved.

However, the number of link members coupled to the first sensor bracket 43 holding the sensor 22 is not limited to two as in embodiments of the present disclosure. The number of the link members may be three or greater than or one. Further, the combination of the elongated hole and the insertion member such as a pin inserted into the elongated hole may be reversed. It is not necessarily need to operate all of the sensor 22, the primary transfer roller 7T, and the driven rollers 21A and 33A by the driving force of the motor 23.

As described above, in the present embodiment, the rotation of the first cam 31A illustrated in FIG. 12 causes the front slider 32 to move in the left-right direction in FIG. 9. By so doing, the primary transfer roller 7T and the driven rollers 21A and 33A can be moved. Further, the sensor 22 can be moved by the rotation of the first cam 31A and the second cam 31B. To be specific, when the primary transfer roller 7T of the most-downstream primary transfer section 203 is arranged at the contact position in FIG. 9 and the small separation position in FIG. 10, the pin 32*d* (see FIG. 16) is moved by the rotation of the first cam 31A to press the first sensor bracket 43. Accordingly, a force that causes the first sensor bracket 43 to rotate clockwise is applied to the first sensor bracket 43. As a result, the position of the sensor 22 can be changed. When the primary transfer roller 7T of the most-downstream primary transfer section 203 is arranged at the large separation position, the rotation of the second cam 31B causes the first sensor bracket 43 to be pulled by the second arm 38. Accordingly, the position of the sensor 22 can be changed.

A second contact-and-separation mechanism 92 as a second movement mechanism and a third contact-and-separation mechanism 93 as a third movement mechanism are described below with reference to FIG. 20. The second contact-and-separation mechanism 92 causes the primary transfer rollers 7C, 7M and 7Y disposed in the central primary transfer section 202 to contact with and separate from the intermediate transfer belt 2. The third contact-and-separation mechanism 93 causes the primary transfer roller 7K disposed in the most-upstream primary transfer section 201 to contact with and separate from the intermediate transfer belt 2.

Figure 20:
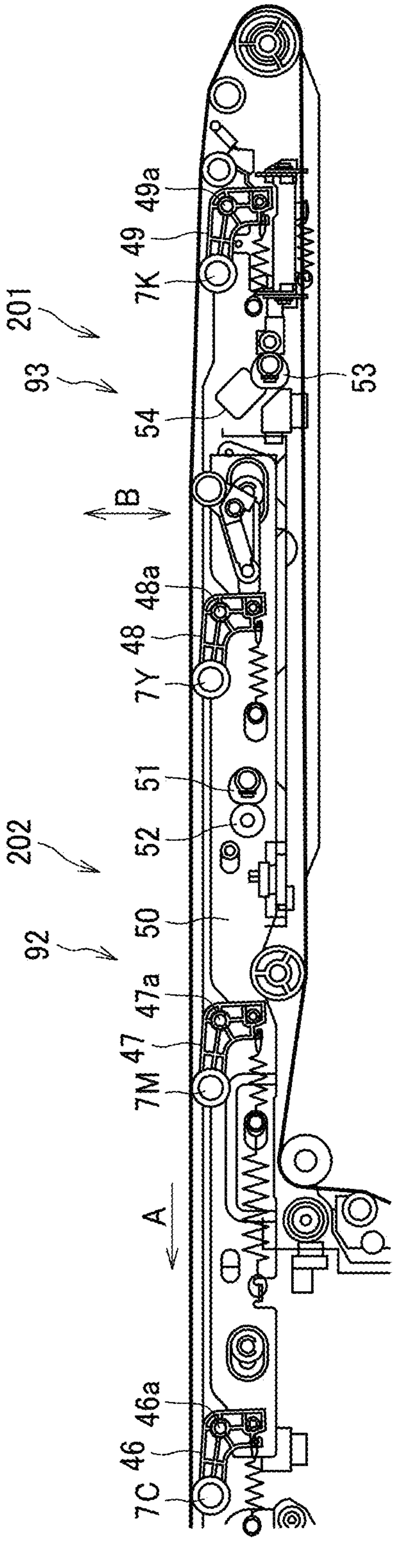
FIG. 20 is a side view of a configuration in which a central primary transfer section and a most-upstream primary transfer section contact with or separate from an intermediate transfer belt, according to an embodiment of the present disclosure.

As illustrated in FIG. 20, the second contact-and-separation mechanism 92 includes rotators 46, 47, 48, a cam 51, and a cam follower 52. The third contact-and-separation mechanism 93 includes a rotator 49, a cam 53, and a cam follower 54. The second contact-and-separation mechanism 92 includes a motor as a driving source to rotate the cam 51, and the third contact-and-separation mechanism 93 includes a motor as a driving source to rotate the cam 53.

The rotators 46, 47, 48, and 49 are rotatable about the rotation fulcrums 46*a*, 47*a*, 48*a*, and 49*a*, respectively. The primary transfer roller 7C is disposed at one end of the rotator 46. The primary transfer roller 7M is disposed at one end of the rotator 47. The primary transfer roller 7Y is disposed at one end of the rotator 48. The primary transfer roller 7K is disposed at one end of the rotator 49. The rotators 46, 47, 48, and 49 are biased by springs to be rotated in a direction in FIG. 20 and cause the primary transfer rollers 7C, 7M, 7Y, and 7K, respectively, to contact the photoconductors 3C, 3M, 3Y, and 3K, respectively, via the intermediate transfer belt 2.

The cam follower 52 rotates by the rotation of the cam 51 to move a front slider 50 of the most-upstream primary transfer section 201 in the right direction in FIG. 20. Accordingly, one end of each of the rotators 46, 47, and 48 opposite to another end at which the corresponding one of the primary transfer rollers 7C, 7M, and 7Y is disposed is pressed. Accordingly, the rotators 46, 47, and 48 rotate counterclockwise in FIG. 20 against the biasing force of the springs. Accordingly, the primary transfer rollers 7C, 7M, and 7Y move away from the intermediate transfer belt 2. Further, the rotation of the cam 53 causes the cam follower 54 to rotate and one end of the rotator 49 opposite to another end of the rotator 49 at which the primary transfer roller 7K is disposed is pressed. Accordingly, the rotator 49 rotates counterclockwise in FIG. 20 against the biasing force of the spring, and the primary transfer roller 7K moves away from the intermediate transfer belt 2. As described above, the primary transfer roller 7K of the most-upstream primary transfer section 201 and the primary transfer rollers 7C, 7M, and 7Y of the central primary transfer section 202 independently contact with and separate from the intermediate transfer belt 2.

Toner supply devices that supply toner to the developing devices 6Y, 6M, 6C, 6K, and 6T are described below with reference to FIGS. 21, 22, and 23.

Figure 21:
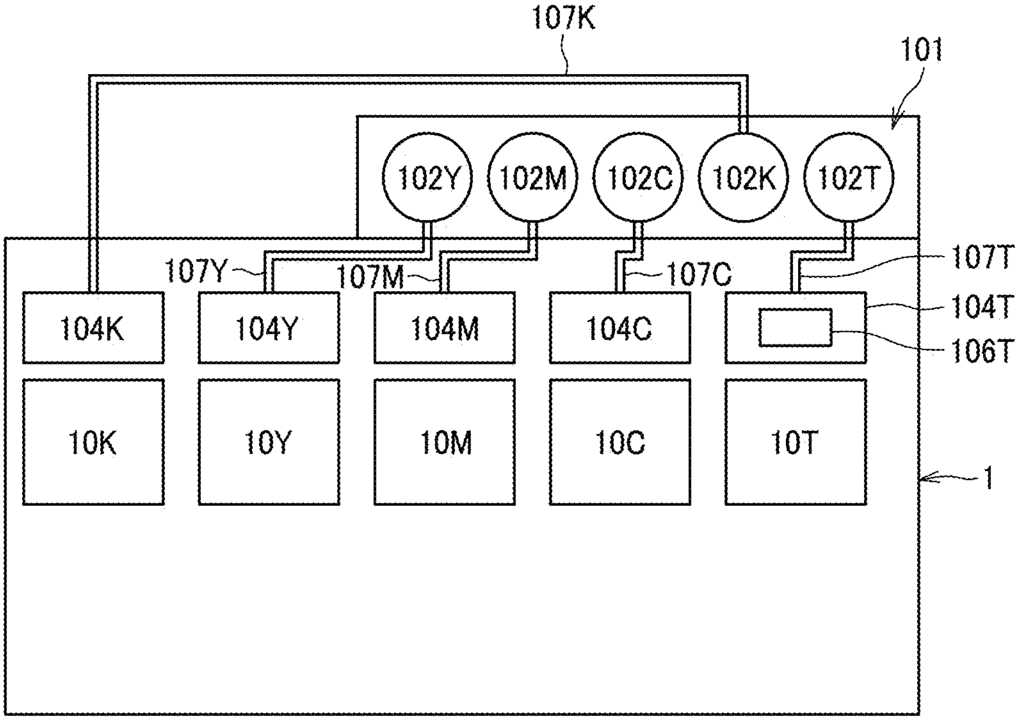
FIG. 21 is a diagram illustrating an arrangement of image forming devices, pre-supply reservoirs, and toner bottles in a case in which a toner bottle of a special color is arranged in a most-downstream primary transfer section, according to an embodiment of the present disclosure.

As illustrated in FIG. 21, the image forming apparatus 1 includes a bottle container 101 in an upper portion of the housing of the image forming apparatus 1. Toner bottles 102Y, 102M, 102C, 102K, and 102T that contain yellow (Y) toner, magenta (M) toner, cyan (C) toner, black (K) toner, and special color toner, respectively, to be supplied are attached to the bottle container 101. Bottle drivers 103Y, 103M, 103C, 103K, and 103T (see FIG. 23) of the toner supply device 150 are fixed to the bottle container 101. The bottle drivers 103Y, 103M, 103C, 103K, and 103T detachably holds the toner bottles 102Y, 102M, 102C, 102K, and 102T, respectively.

Figure 23:
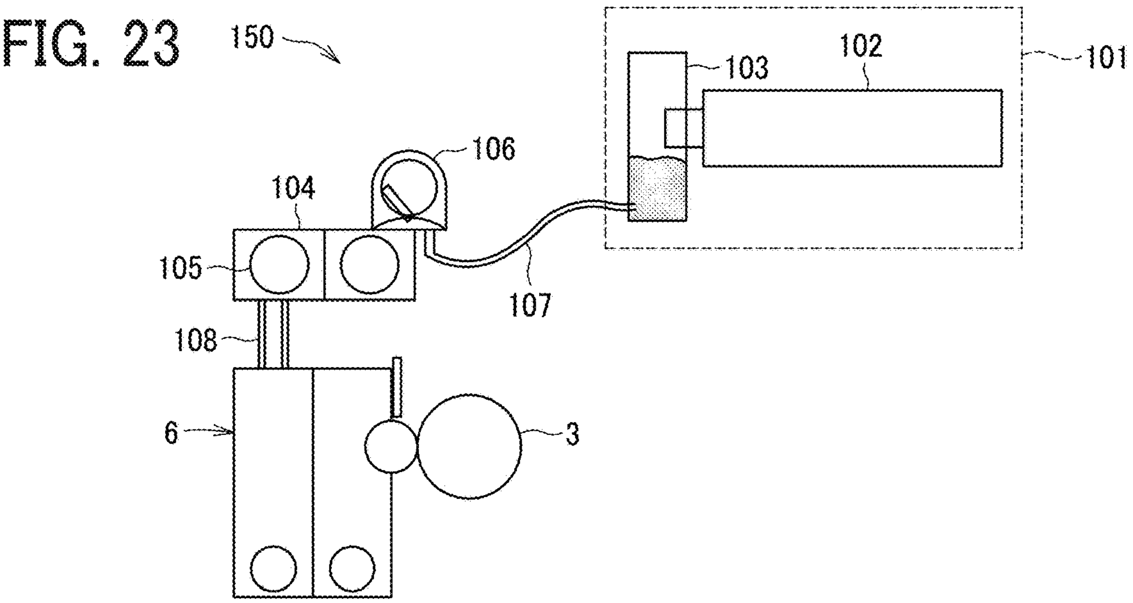
FIG. 23 is a schematic diagram illustrating a configuration of a toner supply device according to an embodiment of the present disclosure.

FIG. 23 is a schematic diagram illustrating a configuration of a toner supply device 150 according to the present embodiment. In FIG. 23, a toner bottle 102, a toner supply device 150, a developing device 6, and a photoconductor 3 for one of the colors T, Y, M, C, or K are illustrated. In FIG. 23 and in the description below, suffixes T, Y, M, C, and K attached to the reference signs of the toner bottle 102, the toner supply device 150, the developing device 6, and the photoconductor 3 are omitted for the sake of convenience.

The toner supply device 150 includes a bottle driver 103, a pre-supply reservoir 104, a toner supply unit 105, a suction pump 106, and a transfer tube 107. The pre-supply reservoir 104 is disposed directly above the developing device 6. One end of transfer tube 107 is connected to the bottle driver 103 and the other end of the transfer tube 107 is connected to the suction pump 106 to form a toner conveyance path to transfer toner from the bottle driver 103 to the pre-supply reservoir 104. In the present embodiment, the transfer tube 107 is a flexible tube.

The bottle driver 103 drives the toner bottle 102 to rotate. Accordingly, toner contained in the toner bottle 102 is transferred from a head opening of the toner bottle 102 to the bottle driver 103. Suction operation of the suction pump 106 causes the toner in the bottle driver 103 to be transferred to the suction pump 106 via the transfer tube 107. At the same time, the toner sucked from the bottle driver 103 is dropped into the pre-supply reservoir 104 from a discharge port of the suction pump 106.

Rotation of the toner supply unit 105 causes the toner stored in the pre-supply reservoir 104 to be supplied to the developing device 6 via a toner supply path 108. As described above, in the present embodiment, the toner transferred from the bottle driver 103 to the vicinity of the developing device 6 by the suction pump 106 is temporarily stored in the pre-supply reservoir 104.

Note that, for example, in the case in which a white toner is employed as a special color to form a white background in an image, a white toner layer is formed at a lowermost layer of the image. For this reason, the most-downstream primary transfer section 203 is arranged most downstream among the most-upstream primary transfer section 201, the central primary transfer section 202, and the most-downstream primary transfer section 203. Alternatively, when a transparent toner image is transferred to apply glossiness to an image, the transparent toner image is formed on the surface of the image. For this reason, in this case, the most-downstream primary transfer section 203 is arranged most upstream among the most-upstream primary transfer section 201, the central primary transfer section 202, and the most-downstream primary transfer section 203.

Figure 22:
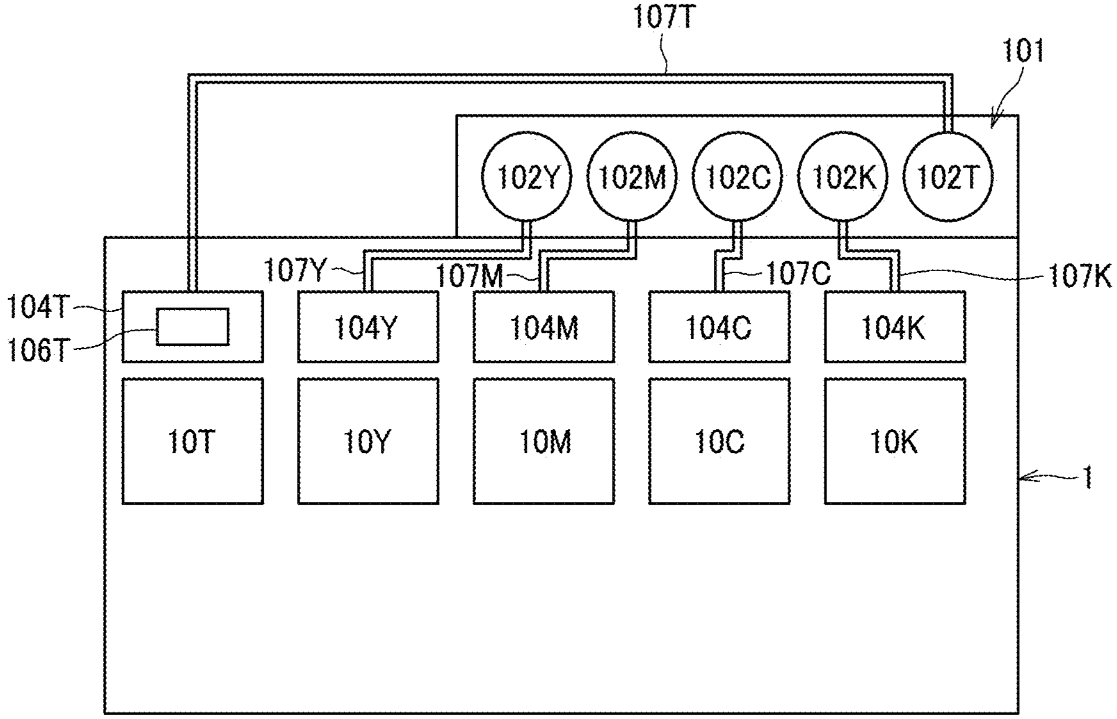
FIG. 22 is a diagram illustrating an arrangement of the image forming devices, the pre-supply reservoirs, and the toner bottles of FIG. 21 in a case in which a toner bottle for black toner is arranged in a most-downstream primary transfer section, according to an embodiment of the present disclosure.

As described above, in order to change the order in which the toner of the special color is primarily transferred in accordance with the type of the special color to be employed, in the present embodiment, the toner supplied to the most-upstream primary transfer section 201 and the most-downstream primary transfer section 203 can be changed as illustrated in FIGS. 21 and 22. More specifically, in FIG. 21, the toner bottle 102T that contains a special color toner is connected to a pre-supply reservoir 104T disposed most downstream in the toner conveyance path on the right side of FIG. 21. The toner bottle 102K that contains black (K) toner is connected to a pre-supply reservoir 104K disposed most upstream in the toner conveyance path in FIG. 21. In FIG. 22, the toner bottle 102K that contains the black (K) toner is connected to the pre-supply reservoir 104K disposed most downstream in the toner conveyance path on the right side of the FIG. 22. The toner bottle 102T that contains the special color toner is connected to the pre-supply reservoir 104T disposed most upstream in the toner conveyance path. In addition, in FIGS. 21 and 22, the arrangement of the toner bottles 102K and 102T and the transfer tubes 107K and 107T connected to the toner bottles 102K and 102T, respectively, are not changed, and destinations to which the transfer tubes 107K and 107T are connected are changed. In other words, in FIG. 21, the transfer tube 107K is extended and connected to the suction pump 106T disposed most upstream in the toner conveyance path. On the other hand, in FIG. 22, the transfer tube 107T is connected to the suction pump 106T disposed most downstream in the toner conveyance path. In contrast to the transfer tube 107T, the transfer tube 107T is significantly stretched toward upstream in the toner conveyance path in FIG. 22. Accordingly, positions at which the black (K) toner and the special color toner are primarily transferred can be changed only by changing the positions of the pre-supply reservoirs 104K, 104Y, 104M, 104C, and 104T and the image forming devices 10K, 10Y, 10M, 10C, and 10T without replacing the toner bottles 102K, 102Y, 102M, 102C, and 102T or the bottle drivers 103Y, 103M, 103C, 103K, and 103T. As a result, the labor for replacing the toner bottles 102K, 102Y, 102M, 102C, and 102T or the bottle drivers 103Y, 103M, 103C, 103K, and 103T can be reduced. The actual length of the transfer tube 107T is longer than the length of the transfer tube 107T illustrated in FIG. 21 and the actual length of the transfer tube 107K is longer than the length of the transfer tube 107K illustrated in FIG. 22. Accordingly, a space in which extra tubes of the transfer tube 107T and the transfer tube 107K can be accommodated is disposed in the image forming apparatus 1.

The operation of changing the colors of toner transferred by the most-upstream primary transfer section 201, the central primary transfer section 202, and the most-downstream primary transfer section 203 is described below with reference to the flowchart of FIG. 24.

Figure 24:
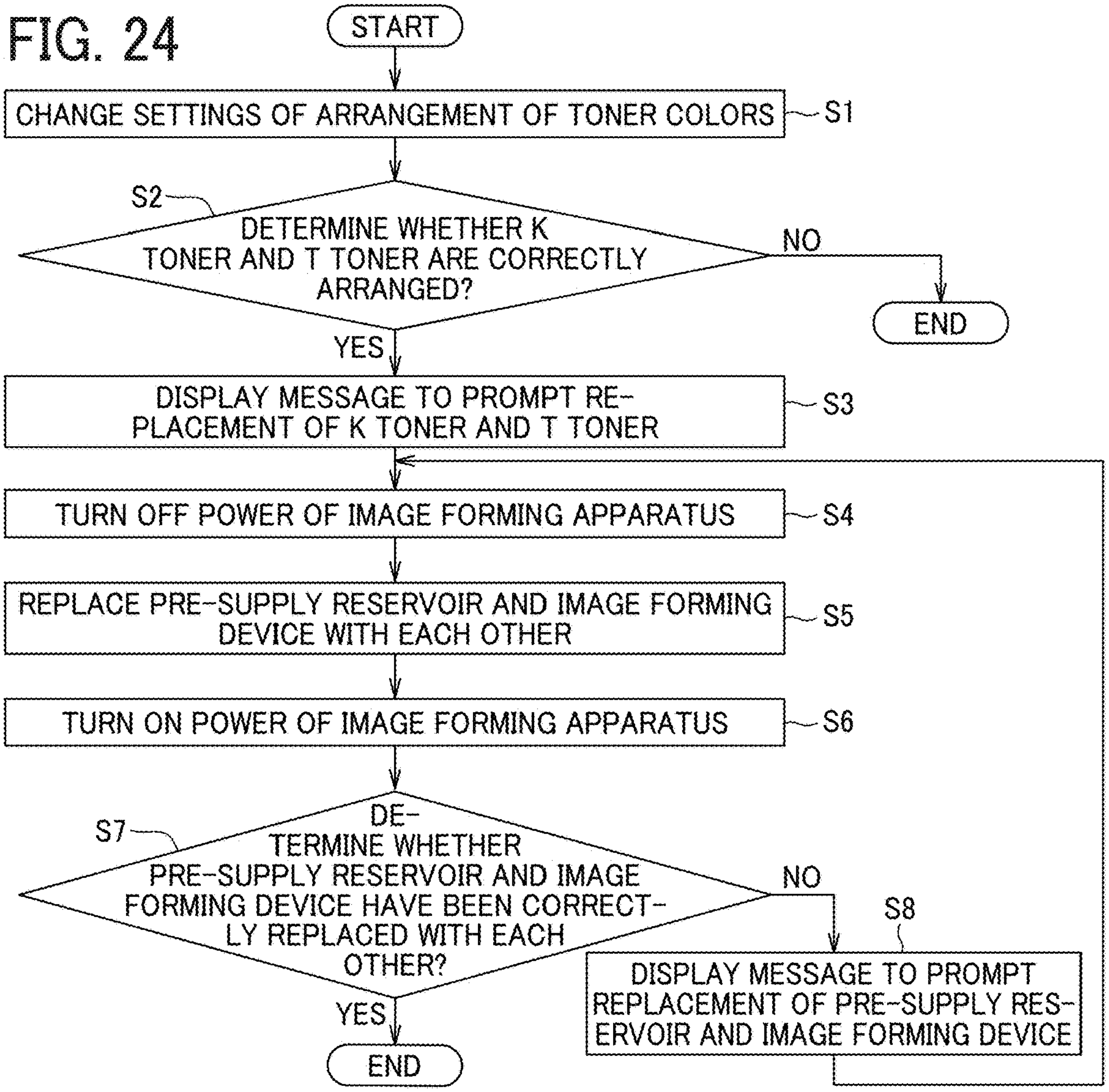
FIG. 24 is a flowchart of a process for checking arrangement of image forming devices, pre-supply reservoirs, and toner bottles, according to an embodiment of the present disclosure.

As illustrated in FIG. 24, first, setting of the arrangement of colors of toner is changed (step S1). Specifically, the black (K) toner is arranged in the most-upstream primary transfer section 201 and the special color toner is arranged in the most-downstream primary transfer section 203. Alternatively, the special color toner is arranged in the most-upstream primary transfer section 201 and the black (K) toner is arranged in the most-downstream primary transfer section 203. Then, a controller 300 (see FIG. 25) of the image forming apparatus 1 determines whether the colors of toner are correctly arranged. When the colors of toner are not correctly arranged, the controller 300 displays a message prompting to replace the black (K) toner with the special color toner on an operation display unit (steps S2 and S3). Then, the power supply of the image forming apparatus 1 is turned off and the pre-supply reservoir 104K is replaced with the pre-supply reservoir 104T and the image forming device 10K is replaced with image forming device 10T. Subsequently, the power supply of the image forming apparatus 1 is turned on again (steps S4, S5, and S6). Then, the controller 300 of the image forming apparatus 1 determines again whether the pre-supply reservoir 104K has been replaced with the pre-supply reservoir 104T and the image forming device 10K have been replaced with image forming device 10T (step S7) correctly. If the replacement has not been correctly performed, the message to replace the black (K) toner with the special color toner is displayed again on the operation display unit (step S8).

In steps S2, S3, S4, S5, S6, and S7, the controller 300 determines whether the black (K) toner and the special color toner are correctly arranged. At the same time, the controller 300 also determines whether a correct color such as the transparent color or the white color is set as the special color.

Before the setting of the image forming apparatus 1 is changed, the power supply of the image forming apparatus 1 may be turned off as in step S4 and the arrangement of the toner colors may be changed as in step S5.

Figure 25:
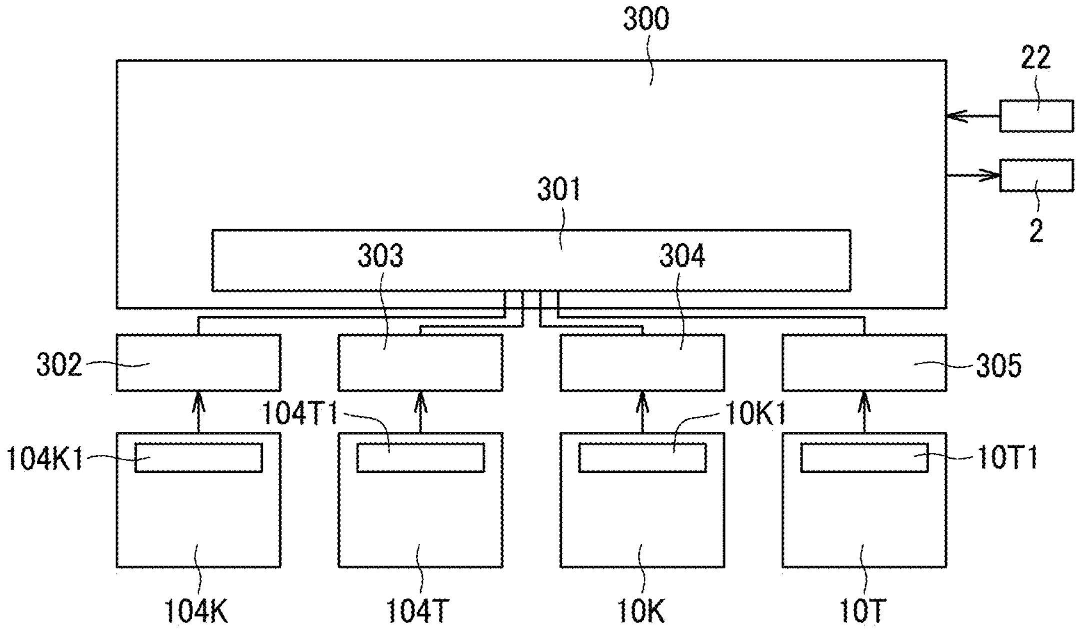
FIG. 25 is a schematic diagram illustrating a configuration of a controller disposed in the image forming apparatus of FIG. 1, according to an embodiment of the present disclosure.

As illustrated in FIG. 25, the controller 300 provided for the image forming apparatus 1 determines whether the black (K) toner and the special color toner are correctly arranged in steps S1, S2, S3, S4, S5, and S6. The controller 300 includes a determination circuit 301 that determines whether the pre-supply reservoirs 104K, 104Y, 104M, 104C, and 104T and the image forming devices 10K, 10C, 10M, 10Y, and 10T are properly arranged.

The determination circuit 301 includes a first connector 302, a second connector 303, a third connector 304, and a fourth connector 305. The first connector 302 is connected to the pre-supply reservoir 104K disposed most upstream in the toner conveyance path. The second connector 303 is connected to the pre-supply reservoir 104T disposed most downstream in the toner conveyance path. The third connector 304 is connected to the image forming device 10K disposed most upstream in the toner conveyance path. The fourth connector 305 is connected to the image forming device 10T disposed most downstream in the toner conveyance path. The pre-supply reservoir 104K includes a circuit board 104K1 connected to the first connector 302, and the pre-supply reservoir 104T includes a circuit board 104T1 connected to the second connector 303. A circuit board 10K1 connected to the third connector 304 is disposed in, for example, a developer container of the developing device 6K of the image forming device 10K. A circuit board 10T1 connected to the fourth connector 305 is disposed in, for example, a developer container of the developing device 6T of the image forming device 10T.

The first connector 302, the second connector 303, the third connector 304, and the fourth connector 305 each includes multiple switches. The determination circuit 301 can determine whether the black (K) toner or the special color toner is arranged and the color of the special color toner if the special color toner is arranged, based on a combination of on and off of the switches when the circuit board 104K1, the circuit board 104T1, the first connector 302, the second connector 303, the third connector 304, the circuit board 10K1, and the circuit board 10T1 is each connected to the first connector 302, the second connector 303, the third connector 304, and the fourth connector 305, respectively. In a case in which the controller 300 determines only whether the black (K) toner or the special color toner is arranged without determining the color of the special color toner, the controller 300 may perform the determination based on whether the feeler 27*a* and the photosensor 28 are turned on or off.

The controller 300 receives a detection result of the sensor 22. The controller 300 changes the rotation speed of the intermediate transfer belt 2 based on the detection result.

The transfer device 20 according to a modification of the above-described embodiments is described below with reference to FIGS. 26 and 27. FIG. 27A is a diagram illustrating the second contact-and-separation mechanism 92 in which the primary transfer rollers 7C, 7M, and 7Y are arranged at the contact positions to contact the intermediate transfer belt 2, according to the modification. FIG. 27B is a diagram illustrating the second contact-and-separation mechanism 92 in which the primary transfer rollers 7C, 7M, and 7Y are arranged at the respective separation positions separated from the intermediate transfer belt 2, according to the modification.

Figure 26:
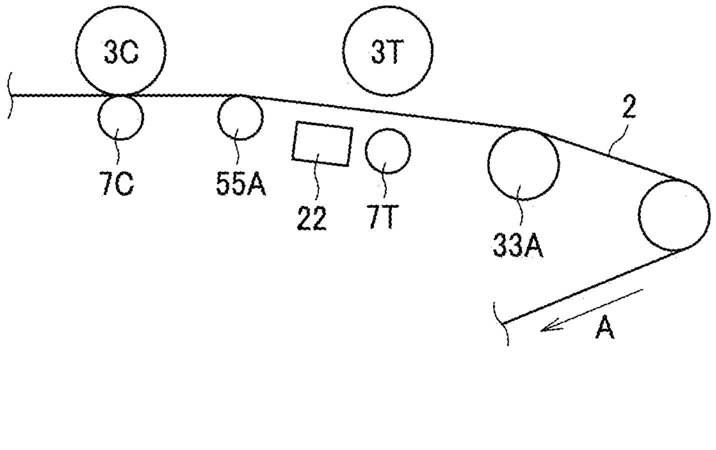
FIG. 26 is a diagram illustrating an arrangement of driven rollers and a sensor, according to an embodiment different from the embodiment of FIG. 5.
Figure 27A:
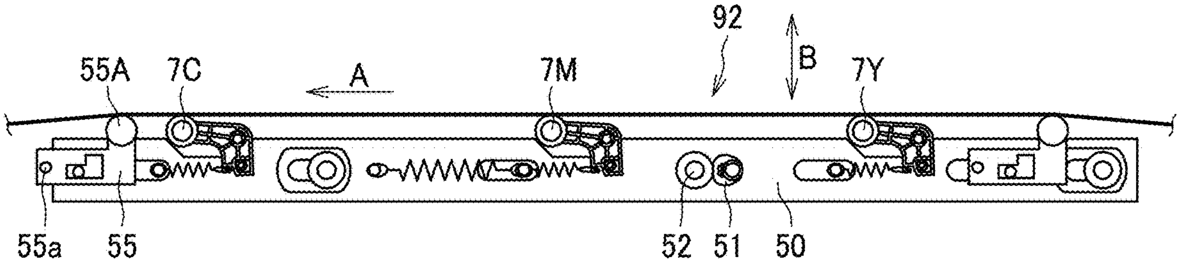
FIGS. 27A and 27B are side views of a configuration in which primary transfer rollers of a central primary transfer section contact with or separate from an intermediate transfer belt, according to a modification of the embodiment of FIG. 5.
Figure 27B:
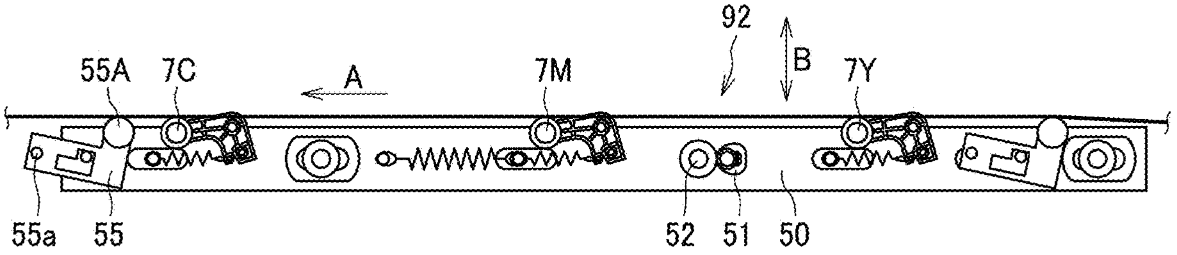

As illustrated in FIG. 26, in the present modification, a driven roller 55A that stretches the intermediate transfer belt 2 is disposed between the primary transfer roller 7T disposed in the most-downstream primary transfer section 203 and the primary transfer roller 7C upstream from the primary transfer roller 7T in the rotation direction of the intermediate transfer belt 2. The driven roller 55A is disposed upstream from the sensor 22 in the rotation direction of the intermediate transfer belt 2. As illustrated in FIG. 27A, the driven roller 55A is disposed at one end of the rotator 55. The rotator 55 is rotatable about a rotation fulcrum 55*a* disposed at an end of the rotator 55 opposite to another end of the rotator 55 at which the driven roller 55A is disposed.

The second contact-and-separation mechanism 92 includes the cam 51. The rotation fulcrum 55*a* is fixed to the front slider 50 that causes the primary transfer rollers 7C, 7M, and 7Y of the central primary transfer section 202 to contact with or separate from the intermediate transfer belt 2. When the cam 51 rotates to move the front slider 50 to the right in FIG. 27A, the rotator 55 is rotated clockwise about the rotation fulcrum 55*a* as illustrated in FIG. 27B.

In the above-described embodiment, the driven roller 55A contacts the intermediate transfer belt 2 when the primary transfer rollers 7Y, 7M, and 7C of the central primary transfer section 202 are positioned at the respective contact positions to stretch the intermediate transfer belt 2. In the above-described mode E in which the primary transfer roller 7T of the most-downstream primary transfer section 203 is arranged at the large separation position and the primary transfer rollers 7Y, 7M, and 7C of the central primary transfer section 202 are arranged at the contact position, the primary transfer roller 7T of the most-downstream primary transfer section 203 is separated from the photoconductor 3T. For this reason, nip pressure of the multiple transfer nips of the primary transfer rollers 7Y, 7M, and 7C of the central primary transfer section 202 is likely to be small. In the present modification, the driven roller 55A disposed between the primary transfer roller 7T of the most-downstream primary transfer section 203 and the primary transfer roller 7C disposed immediately upstream from the primary transfer roller 7T contacts the intermediate transfer belt 2 when the primary transfer rollers 7Y, 7M, and 7C of the central primary transfer section 202 are arranged at the respective contact positions. By so doing, transfer pressure of the transfer nips of the primary transfer rollers 7Y, 7M, and 7C of the central primary transfer section 202 can be prevented from being decreased.

In addition, the sensor 22 is disposed between the driven roller 55A and the primary transfer roller 7T. By so doing, the rotation speed of the intermediate transfer belt 2 can be detected in a state in which there is no influence of the vibration of the driven roller 55A to the intermediate transfer belt 2. Thus, accuracy of the rotation speed of the intermediate transfer belt 2 in the most-downstream primary transfer section 203 can be particularly enhanced.

Figure 28A:
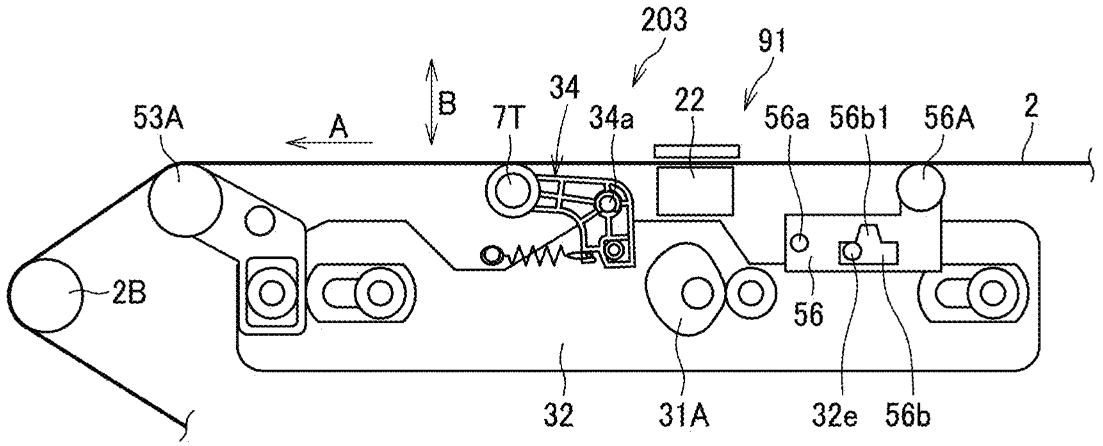
FIGS. 28A, 28B, and 28C are plan views of a configuration in which a primary transfer roller of a most-downstream primary transfer section according to a modification of the embodiment of FIG. 5 different from the modification of FIGS. 27A and 27B.
Figure 28B:
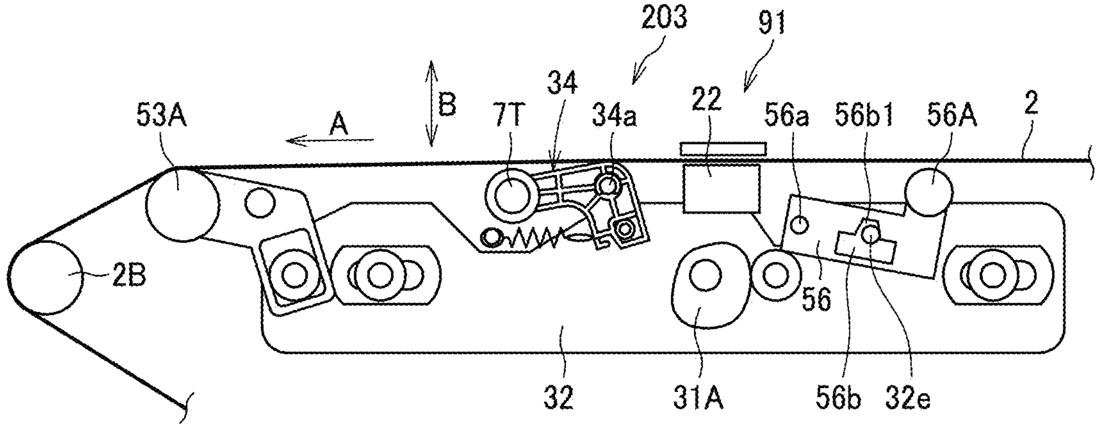
Figure 28C:
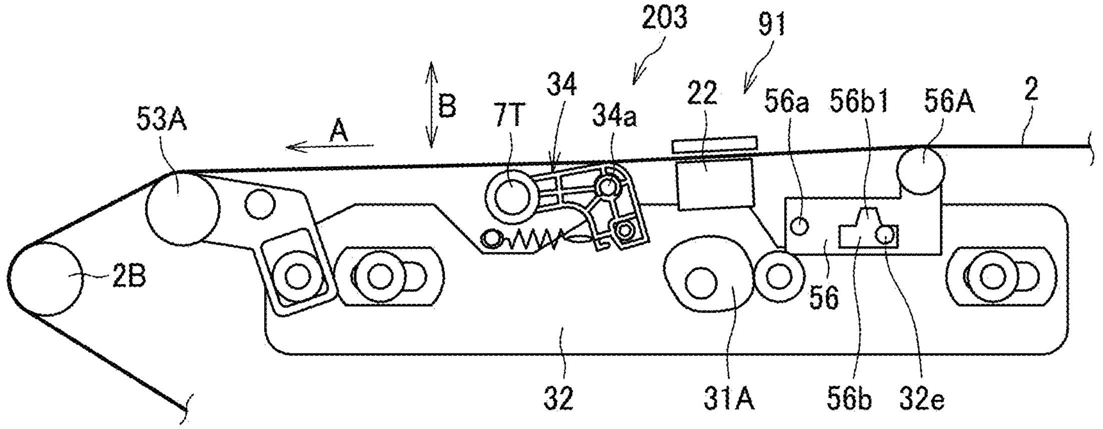

Another embodiment of the present disclosure is described below with reference to FIGS. 28A, 28B, and 28C. In the present embodiment, the driven roller 56A, which is disposed between the primary transfer roller 7T of the most-downstream primary transfer section 203 and the primary transfer roller 7C immediately upstream from the primary transfer roller 7T, is moved by the first contact-and-separation mechanism 91 that causes the primary transfer roller 7T of the most-downstream primary transfer section 203 to contact with or separate from the intermediate transfer belt 2. FIG. 28A is a diagram illustrating the first contact-and-separation mechanism 91 in a case in which the primary transfer roller 7T is arranged at the contact position, according to the present embodiment. FIG. 28B is a diagram illustrating the first contact-and-separation mechanism 91 in a case in which the primary transfer roller 7T is arranged at the small separation position, according to the present embodiment. FIG. 28C a diagram illustrating the first contact-and-separation mechanism 91 in a case in which the primary transfer roller 7T is arranged at the large separation position, according to the present embodiment.

As illustrated in FIG. 28A, a rotator 56 is rotatable about a rotation fulcrum 56*a* disposed at an end of the rotator 56 opposite to another end of the rotator 56 at which the driven roller 56A is disposed. The rotation fulcrum 56*a* is fixed to the front slider 32 that causes the primary transfer roller 7T of the most-downstream primary transfer section 203 to contact with or separate from the intermediate transfer belt 2. A mechanism that causes the sensor 22 to contact with or separate from the intermediate transfer belt 2 is similar to the mechanism employed in the above-described embodiment.

The rotator 56 includes a hole 56*b*. A pin 32*e* of the front slider 32 is inserted into the hole 56*b*. The hole 56*b* has the same height at both ends of the hole 56*b* in the horizontal direction in FIGS. 28A, 28B, and 28C, i.e., a direction in which the front slider 32 moves. The height is a height of the hole 56*b* in the vertical direction in FIGS. 28A, 28B, and 28C and height of the hole 56*b* in a direction in which the hole 56*b* contacts with or moves away from the intermediate transfer belt 2. In addition, the hole 56*b* has a shape such that the hole 56*b* includes a convex portion 56*b*1 protruding toward the intermediate transfer belt 2 at the center of the hole 56*b* in the horizontal direction in FIGS. 28A, 28B, and 28C, i.e., the direction in which the front slider 32 moves. Due to the shape of the hole 56*b* described above, the driven roller 56A can be separated from the intermediate transfer belt 2 only when the primary transfer roller 7T of the most-downstream primary transfer section 203 is arranged at the small separation position. The driven roller 56A can contact the intermediate transfer belt 2 when the primary transfer roller 7T of the most-downstream primary transfer section 203 is arranged at the large separation position. In other words, when the primary transfer roller 7T of the most-downstream primary transfer section 203 in FIG. 28B is arranged at the small separation position, the pin 32*e* of the front slider 32 is accommodated in the convex portion 56*b*1 of the hole 56*b*. Accordingly, the rotator 56 rotates clockwise in FIG. 28B. As a result, the driven roller 56A moves away from the intermediate transfer belt 2. On the other hand, when the primary transfer roller 7T of the most-downstream primary transfer section 203 in FIG. 28B is arranged at the large separation position, the pin 32*e* moves toward a right end of the hole 56*b*. Accordingly, the rotator 56 rotates counterclockwise, and the driven roller 56A contacts the intermediate transfer belt 2.

Also in the present embodiment, the driven roller 56A can contact the intermediate transfer belt 2 when the primary transfer rollers 7Y, 7M, and 7C of the central primary transfer section 202 are arranged at the respective contact positions and the primary transfer roller 7T of the most-downstream primary transfer section 203 is arranged at the large separation position. As a result, the transfer pressure of the transfer nips of the primary transfer rollers 7Y, 7M, and 7C of the central primary transfer section 202 can be prevented from being decreased. Further, due to the shape of the hole 56*d* described above, the driven roller 56A can be separated from the intermediate transfer belt 2 only when the primary transfer roller 7T of the most-downstream primary transfer section 203 is arranged at the small separation position.

The primary transfer roller 7T of the most-downstream primary transfer section 203 may be switched only between the two positions of the contact position and the large separation position described in the above-described embodiments. However, in this case, the primary transfer roller 7T of the most-downstream primary transfer section 203 is arranged at the large separation position and the primary transfer rollers 7Y, 7M, and 7C of the central primary transfer section 202 are arranged at the respective separation positions. In such a combination, remaining belt length of the intermediate transfer belt 2 needs to be adjusted.

Figure 29:
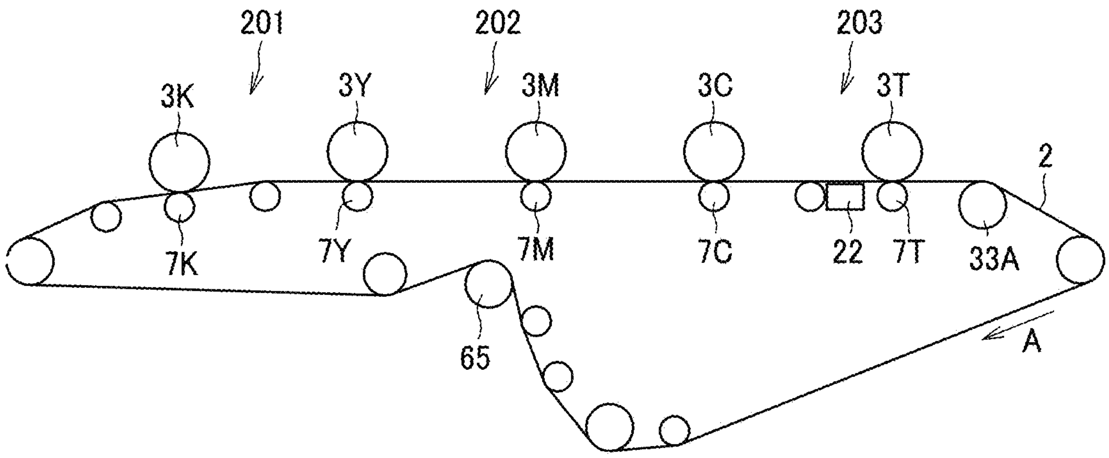
FIG. 29 is a schematic diagram illustrating a configuration of a transfer device according to a modification of the embodiment of FIG. 5 different from the modification of FIGS. 27A and 27B in which a primary transfer roller of a most-downstream primary transfer section is arranged at a contact position.

FIG. 29 is a diagram illustrating the transfer device 20 operated in the above-described mode D in which the primary transfer roller 7T of the most-downstream primary transfer section 203 and the primary transfer rollers 7Y, 7M, and 7C of the central primary transfer section 202 are arranged at the respective contact positions, according to the present embodiment.

In FIG. 29, the primary transfer roller 7K of the most-upstream primary transfer section 201, the primary transfer rollers 7Y, 7M, and 7C of the central primary transfer section 202, the primary transfer roller 7T of the most-downstream primary transfer section 203, and driven roller 33A contact the intermediate transfer belt 2 from below in FIG. 29, to stretch the intermediate transfer belt 2. From the above-described state, the primary transfer roller 7T of the most-downstream primary transfer section 203 is moved to the large separation position and the primary transfer rollers 7Y, 7M, and 7C of the central primary transfer section 202 are moved to the separation position. In other words, the multiple primary transfer rollers 7Y, 7M, 7C, and 7T and the driven roller 33A are moved downward in FIG. 29 to separate the intermediate transfer belt 2 from the photoconductors 3Y, 3M, 3C, and 3T. Accordingly, a difference between the circumferential length of the intermediate transfer belt 2 is larger than the circumferential length of the intermediate transfer belt 2 in FIG. 29. For this reason, the intermediate transfer belt 2 has a surplus length.

Figure 30A:
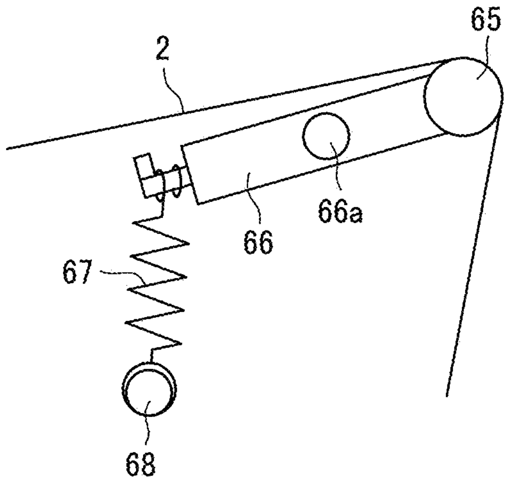
FIGS. 30A and 30B are plan views of a rotation mechanism for rotating a tension roller, according to an embodiment of the present disclosure.
Figure 30B:
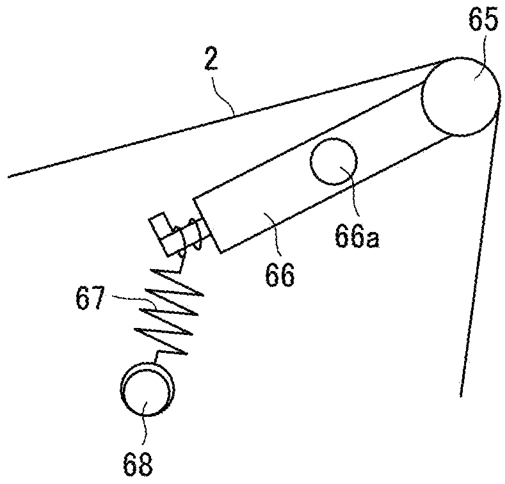

For this reason, in the present embodiment, a position varying mechanism that allows the position of a tension roller 65 to be variable is provided for the intermediate transfer belt 2. The tension roller 65 applies tension to the intermediate transfer belt 2 from the outer circumferential surface of the intermediate transfer belt 2. This position varying mechanism is described with reference to FIGS. 30A and 30B below. FIG. 30A is a diagram illustrating the tension roller 65 attached to the rotation mechanism 66 in the mode D in which the primary transfer roller 7T of the most-downstream primary transfer section 203 and the primary transfer rollers 7Y, 7M, and 7C of the central primary transfer section 202 are arranged at the contact position, according to the present embodiment. FIG. 30B is a diagram illustrating the tension roller 65 attached to the rotation mechanism 66 in which the primary transfer roller 7T of the most-downstream primary transfer section 203 is arranged at the large separation position and the primary transfer rollers 7Y, 7M, and 7C of the central primary transfer section 202 are arranged at the separation position, according to the present embodiment. The other mechanisms of the present embodiment are similar to the mechanisms of the above-described embodiments.

As illustrated in FIG. 30A, the tension roller 65 is attached to one end of the rotation mechanism 66. The rotation mechanism 66 is rotatable around a rotation fulcrum 66*a*. One end of a spring 67 is fixed to the other end of the rotation mechanism 66. The other end of the spring 67 is fixed to a housing of the image forming apparatus 1 by a stud 68. A force is applied to the rotation mechanism 66 by the spring 67 to cause the rotation mechanism 66 to rotate counterclockwise in FIG. 30A about the rotation fulcrum 2*a*.

For example, when the primary transfer rollers 7Y, 7M, and 7C of the central primary transfer section 202 and the primary transfer roller 7T of the most-downstream primary transfer section 203 in FIG. 29 are moved from the contact position to the separation position or the large separation position, the position at which the intermediate transfer belt 2 is stretched is lower than the position at which the intermediate transfer belt 2 is stretched in FIG. 29. Accordingly, the circumferential length of the intermediate transfer belt 2 on the primary transfer side is shorter. At this time, as illustrated in FIG. 30A and FIG. 30B, the rotation mechanism 66 further rotates counterclockwise about the rotation fulcrum 66*a* by the pulling force of the spring 67. Accordingly, the position at which the tension roller 65 is pressed against the intermediate transfer belt 2 changes. In other words, the tension roller 65 is pressed against the intermediate transfer belt 2 by the spring 67. Thus, the surplus of the circumferential length of the intermediate transfer belt 2 in the vicinity of the most-downstream primary transfer section 203 can be absorbed.

Embodiments of the present disclosure have been described as above. However, embodiments of the present disclosure are not limited to the embodiments described above, and various modifications and improvements are possible without departing from the gist of the present disclosure.

Examples of the recording sheet include, in addition to the sheet P (plain paper), thick paper, a postcard, an envelope, thin paper, coated paper such as coated paper or art paper, tracing paper, an overhead projector (OHP) sheet, a plastic film, prepreg, copper foil.

In the above-described embodiments of the present disclosure, the primary transfer roller 7T and the driven rollers 33A and 21A of the most-downstream primary transfer section 203 are moved by the driving force of the common driving source. However, each of the primary transfer roller 7T and the driven rollers 33A and 21A of the most-downstream primary transfer section 203 may be moved by the driving force of a different driving source.

In the above-described embodiments of the present disclosure, the distance between the primary transfer roller 7T as the most-downstream primary transfer device and the photoconductor 3T is greater at the large separation position than at the small separation position. However, the primary transfer roller 7T may not be moved when the primary transfer roller 7T is arranged at the small separation position and the large separation position.

In the above description of the embodiments, the configuration in which the primary transfer rollers of all the primary transfer sections contact and separate from the corresponding one of the photoconductors has been described. However, at least any one of the primary transfer rollers of the most-downstream primary transfer section, the central primary transfer section, and the most-upstream primary transfer section, upstream from the most-downstream primary transfer section, may contact and separate from the corresponding one of the photoconductors. In addition, the transfer device does not necessarily transfer toner of five colors including a special color.

Aspects of the present disclosure are, for example, as follows.

First Aspect

In a first aspect of the present disclosure, a transfer device includes an intermediate transferor to rotate, multiple primary transfer sections, a first tension roller, a first movement mechanism, and a second movement mechanism. The multiple primary transfer sections transfer developer images to the intermediate transferor and each of the plurality of primary transfer sections includes a primary transferor. The first tension roller is disposed downstream from a most-downstream primary transferor of a most-downstream primary transfer section most downstream among the plurality of primary transfer sections in a rotation direction of the intermediate transferor, to stretch the intermediate transferor. The first movement mechanism causes the first tension roller to move and change a position at which the tension roller stretches the intermediate transferor. The second movement mechanism causes the primary transferor of a primary transfer section upstream from the most-downstream primary transfer section in the rotation direction of the intermediate transferor to move to a contact position at which the primary transferor contacts a latent image bearer with the intermediate transferor interposed between the primary transferor and the latent image bearer and a separation position at which the primary transferor is separated from the latent image bearer. The most-downstream primary transferor is movable between a contact position at which the most-downstream primary transferor contacts another latent image bearer with the intermediate transferor interposed between the most-downstream primary transferor and still the other latent image bearer and a separation position at which the most-downstream primary transferor is separated from the other latent image bearer. The first movement mechanism causes the first tension roller to move to at least three positions at each of which the first tension roller stretches the intermediate transferor.

Second Aspect

The transfer device according to the first aspect further includes at least five primary transferors, and a third movement mechanism to cause a most-upstream primary transferor, which is the primary transferor of a most-upstream primary transfer section most upstream among the plurality of primary transfer sections in the rotation direction of the intermediate transferor, to move to a contact position at which the most-upstream primary transferor contacts still another latent image bearer with the intermediate transferor interposed between the most-upstream primary transferor and the still other latent image bearer and a separation position at which the most-upstream primary transferor is separated from the still other latent image bearer.

The second movement mechanism causes at least three central primary transferors, which are primary transferors of a central primary transfer section between the most-upstream primary transfer section and the most-downstream primary transfer section, to move from a contact position at which each one of the at least three central primary transferors contacts a corresponding latent image bearer with the intermediate transferor interposed between each one of the at least three central primary transferors and the corresponding latent image bearer to a separation position at which each of one of the at least three central primary transferors is separated from the corresponding latent image bearer.

Third Aspect

The transfer device according to the second aspect further includes a first contact-and-separation mechanism to cause the most-downstream primary transferor to move to the contact position and the separation position. The first movement mechanism causes the first tension roller to move to a first position, a second position, and a third position. The first tension roller is arranged at the first position when the most-downstream primary transferor is arranged at the contact position. The first tension roller is arranged at the second position when the most-downstream primary transferor is arranged at the separation position and the primary transferor upstream from the most-downstream primary transfer section in the rotation direction of the intermediate transferor is arranged at the separation position.

The first tension roller is arranged at the third position when the most-downstream primary transferor is arranged at the separation position and the primary transferor upstream from the most-downstream primary transfer section in the rotation direction of the intermediate transferor is arranged at the contact position.

The first tension roller arranged at the third position is farther away from the latent image bearer than the first tension roller arranged at the second position in a direction in which the primary transferor contacts with or separates from the latent image bearer.

Fourth Aspect

In the transfer device according to the first or third aspect, the first contact-and-separation mechanism is the first movement mechanism.

Fifth Aspect

In the transfer device according to the third or fourth aspect, the second movement mechanism causes each one of the at least three central primary transferors to move from the separation position to the contact position after the first movement mechanism has caused the first tension roller to move from the second position to the third position. The above-described movements of the at least three central primary transferors and the first tension roller correspond to the movements described in the above-described Table 1 when the mode A is switched to the mode E.

Sixth Aspect

In the transfer device according to the third or fourth aspect, the first movement mechanism causes the first tension roller to move from the third position to the second position after the second movement mechanism has moved each one of the at least three central primary transferors from the contact position to the separation position. The above-described movements of the first tension roller and the at least three central primary transferors correspond to the movements described in the above-described Table 1 when the mode E is switched to the mode A.

Seventh Aspect

In the transfer device according to the third or fourth aspect, the first movement mechanism causes the first tension roller to move from the third position to the second position after the second movement mechanism has moved each one of the at least three central primary transferors from the contact position to the separation position. The above-described movements of the first tension roller and the at least three central primary transferors correspond to the movements described in the above-described Table 1 when the mode E is switched to the mode F.

Eighth Aspect

In the transfer device according to the third or fourth aspect, the second movement mechanism causes each one of the at least three central primary transferors to move from the separation position to the contact position after the first movement mechanism has caused the first tension roller to move from the second position to the third position. The above-described movements of the at least three central primary transferors and the first tension roller correspond to the movements described in the above-described Table 1 when the mode F is switched to the mode E.

Ninth Aspect

In the transfer device according to the third or fourth aspect, the third movement mechanism causes the most-upstream primary transferor from the separation position to the contact position after the first movement mechanism has caused the first tension roller to move from the first position to the second position and the most-downstream primary transferor to move from the contact position to the separation position. The above-described movements of the most-upstream primary transferor, the first tension roller, and the most-downstream primary transferor correspond to the movements described in the above-described Table 1 when the mode B is switched to the mode F.

Tenth Aspect

In the transfer device according to the third or fourth aspect, the first movement mechanism causes the first tension roller to move from the second position to the first position and the most-downstream primary transferor to move from the separation position to the contact position, after the third movement mechanism has caused the most-upstream primary transferor to move from the contact position to the separation position. The above-described movements of the first tension roller, the most-downstream primary transferor, and the most-upstream primary transferor correspond to the movements described in the above-described Table 1 when the mode F is switched to the mode B.

Eleventh Aspect

In the transfer device according to the third or fourth aspect, the first movement mechanism causes a single driving source to move the most-downstream primary transferor and the first tension roller.

Twelfth Aspect

The transfer device according to any one of the second to eleventh aspects further includes a second tension roller between the most-downstream primary transferor and a primary transferor immediately upstream from the most-downstream primary transferor to stretch the intermediate transferor.

The second tension roller stretches the intermediate transferor when the most-downstream primary transferor is separated from the intermediate transferor and the primary transferor immediately upstream from the most-downstream primary transferor contacts a corresponding latent image bearer.

Thirteenth Aspect

In the transfer device according to the twelfth aspect, the second movement mechanism causes the second tension roller to contact with and separate from the intermediate transferor.

Fourteenth Aspect

In the transfer device according to the twelfth aspect, the first movement mechanism causes the second tension roller to contact with and separate from the intermediate transferor.

Fifteenth Aspect

In the transfer device according to any one of the first to fourteenth aspects, the most-downstream primary transferor transfers developer of a special color other than any of yellow, magenta, cyan, and black to the intermediate transferor.

Sixteenth Aspect

In a sixteenth aspect of the present disclosure, an image forming apparatus includes the transfer device and the multiple latent image bearers.

The invention claimed is:

1. A transfer device, comprising:

a plurality of rollers including a first roller, a second roller and a third roller;

an intermediate transferor to rotate in a rotation direction, wherein the intermediate transferor is stretched by the plurality of rollers, the first roller is upstream of the second roller and the third roller, and the second roller is upstream of the third roller;

a plurality of primary transfer sections to transfer developer images to the intermediate transferor, the plurality of primary transfer sections each including a primary transferor, and the plurality of primary transfer sections are disposed between the first roller and the second roller;

a tension roller which is a driven roller to stretch the intermediate transferor, the tension roller being downstream from a most-downstream primary transferor of a most-downstream primary transfer section of the plurality of primary transfer sections in the rotation direction;

a first movement motor to move the tension roller and change a position at which the tension roller stretches the intermediate transferor; and a second movement motor to move a first primary transferor, of a first primary transfer section upstream from the most-downstream primary transfer section in the rotation direction, between a first contact position and a first separation position, the first contact position being at which the primary transferor contacts a latent image bearer with the intermediate transferor interposed between the first primary transferor and the latent image bearer, and the first separation position being at which the primary transferor is separated from the latent image bearer, wherein the third roller forms a secondary transfer section, the most-downstream primary transferor is movable between a second contact position and a second separation position, the second contact position being at which the most-downstream primary transferor contacts with another latent image bearer with the intermediate transferor interposed between the most-downstream primary transferor and the another latent image bearer, and the second separation position at which the most-downstream primary transferor is separated from the another latent image bearer, and the first movement motor moves the tension roller between at least three positions at each of which the tension roller stretches the intermediate transferor, the at least three positions including:

a first position at which the most-downstream primary transferor is in contact with the intermediate transferor for image transfer in a first image transfer mode, a second position at which the most-downstream primary transferor is positioned a first distance away from the intermediate transferor for image transfer in a second image transfer mode, and a third position at which the most-downstream primary transferor is positioned a second distance away from the intermediate transferor for image transfer in a third image transfer mode, the second distance being larger than the first distance.

2. The transfer device according to claim 1, further comprising at least five primary transferors; and a third movement motor to move a most-upstream primary transferor, of a most-upstream primary transfer section most-upstream among the plurality of primary transfer sections in the rotation direction, between a third contact position and a third separation position, the third contact position being at which the most-upstream primary transferor contacts still another latent image bearer with the intermediate transferor interposed between the most-upstream primary transferor and the still another latent image bearer, and the third separation position being at which the most-upstream primary transferor is separated from the still another latent image bearer, wherein the second movement motor moves at least three central primary transferors, which are primary transferors of a central primary transfer section between the most-upstream primary transfer section and the most-downstream primary transfer section, to move from contact positions to separation positions, the contact positions at which each one of the at least three central primary transferors contacts a corresponding latent image bearer with the intermediate transferor interposed between each one of the at least three central primary transferors and the corresponding latent image bearer, and the separation positions at which each of one of the at least three central primary transferors is separated from the corresponding latent image bearer.

3. The transfer device according to claim 2, further comprising:

a first contact-and-separation motor to move the most-downstream primary transferor between the second contact position and the second separation position.

4. The transfer device according to claim 2, wherein the first movement motor is a first contact-and-separation motor to move the most-downstream primary transferor between the second contact position and the second separation position.

5. The transfer device according to claim 4, wherein the second movement motor moves the at least three central primary transferors from the separation positions to the contact positions after the first movement motor has moved the tension roller from the second position to the third position.

6. The transfer device according to claim 5, wherein the tension roller moves when the intermediate transferor rotates.

7. The transfer device according to claim 5, wherein the another latent image bearer corresponding to the most-downstream primary transferor stops rotation during movement of the tension roller.

8. The transfer device according to claim 4, wherein the first movement motor moves the tension roller from the third position to the second position after the second movement motor has moved the at least three central primary transferors from the contact positions to the separation positions.

9. The transfer device according to claim 4, wherein the first movement motor moves the at least three central primary transferors from the separation positions to the contact positions after the second movement motor has moved the tension roller from the second position to the third position when the most-upstream primary transferor is arranged at the third contact position.

10. The transfer device according to claim 4, wherein the second movement motor moves the at least three central primary transferors from the separation positions to the contact positions after the first movement motor has moved the tension roller from the second position to the third position when the most-upstream primary transferor is arranged at the third contact position.

11. The transfer device according to claim 4, wherein the third movement motor moves the most-upstream primary transferor from the third separation position to the third contact position after the first movement motor has moved the tension roller from the first position to the second position and the most-downstream primary transferor from the second contact position to the second separation position.

12. The transfer device according to claim 11, wherein the latent image bearer other than the still another latent image bearer corresponding to the most-upstream primary transferor and the another latent image bearer corresponding to the most-downstream primary transferor stops rotation during movement of the tension roller.

13. The transfer device according to claim 4, wherein the first movement motor moves the tension roller from the second position to the first position and the most-downstream primary transferor moves from the second separation position to the second contact position, after the third movement motor has moved the most-upstream primary transferor from the third contact position to the third separation position.

14. The transfer device according to claim 4, further comprising a single driving source including the first motor and the second motor.

15. The transfer device according to claim 2, further comprising:

another tension roller between the most-downstream primary transferor and a primary transferor immediately upstream from the most-downstream primary transferor to stretch the intermediate transferor, wherein the another tension roller stretches the intermediate transferor when the most-downstream primary transferor is separated from the intermediate transferor and the primary transferor immediately upstream from the most-downstream primary transferor contacts a corresponding latent image bearer.

16. The transfer device according to claim 15, wherein the second movement motor moves the another tension roller between contact with and separation from the intermediate transferor.

17. The transfer device according to claim 15, wherein the first movement motor moves the another tension roller between contact with and separation from the intermediate transferor.

18. The transfer device according to claim 1, wherein the most-downstream primary transferor transfers developer of a special color other than any of yellow, magenta, cyan, and black to the intermediate transferor.

19. An image forming apparatus comprising:

the transfer device according to claim 1; and a plurality of latent image bearers including the latent image bearer and the another latent image bearer.

20. The transfer device according to claim 1, further comprising:

a sensor that detects a rotation speed of the intermediate transferor, wherein the sensor moves in conjunction with movement of a corresponding primary transferor of a primary transfer section of the plurality of primary transfer sections.

* * * * *